United States Patent [19]
Miura

[11] Patent Number: 5,889,838
[45] Date of Patent: *Mar. 30, 1999

[54] TELEPHONE SET

[75] Inventor: Toshiya Miura, Kyoto, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 615,960

[22] Filed: Mar. 14, 1996

[30] Foreign Application Priority Data

Mar. 14, 1995 [JP] Japan .................... 7-054736

[51] Int. Cl.⁶ ............................ H04M 1/64; H04M 11/00
[52] U.S. Cl. ............................ 379/67.1; 379/70; 379/80; 379/88.07; 379/88.11; 379/88.22; 379/88.27; 379/100.16
[58] Field of Search ................................ 379/67, 88, 89, 379/68, 85, 67.1, 70, 80, 88.07, 88.11, 88.22, 88.27, 100.16

[56] References Cited

U.S. PATENT DOCUMENTS

| | | | |
|---|---|---|---|
| 4,757,525 | 7/1988 | Matthews et al. ...................... | 379/89 |
| 5,172,404 | 12/1992 | Hashimoto ............................... | 379/88 |
| 5,283,818 | 2/1994 | Klausner et al. ........................ | 379/67 |
| 5,400,393 | 3/1995 | Knuth et al. ............................. | 379/88 |
| 5,504,806 | 4/1996 | Kawakami ............................... | 379/67 |

FOREIGN PATENT DOCUMENTS

| | | |
|---|---|---|
| 2-246655 | 10/1990 | Japan . |
| 3-186045 | 8/1991 | Japan . |

OTHER PUBLICATIONS

Abstract for Japanese Unexamined Patent Publication JPA 3-192,946.

*Primary Examiner*—Fan S. Tsang
*Assistant Examiner*—Allan Hoosain

[57] ABSTRACT

In a telephone set, a voiced and silent section detecting device detects whether the voice message stored in a storage device by an automatic answering function is a voiced section or a silent section, and the detected voiced or silent section information is stored in a storage device, corresponding to the voice message. Therefore, by pressing a skip operation button while reproducing a voice message, reproduction is started from the start position of the next voiced section.

24 Claims, 31 Drawing Sheets

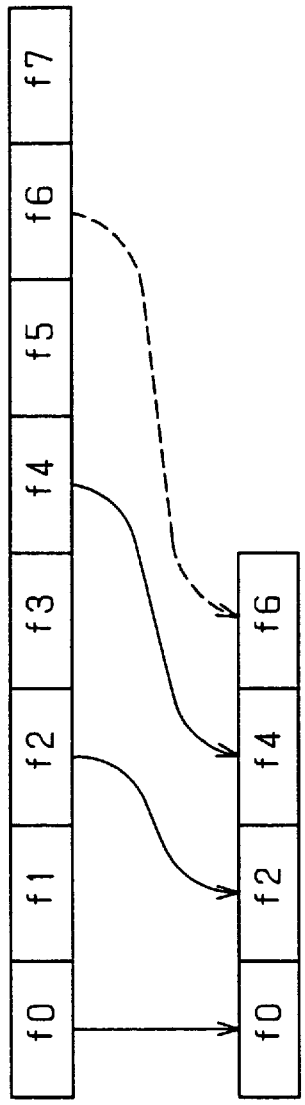
FIG. 3A
FIG. 3B
FIG. 3C  NORMAL REPRODUCTION
FIG. 3D  REVERSE REPRODUCTION / REPRODUCTION FROM FINAL FRAME

NORMAL REPRODUCTION (RECORDED WAVEFORM)

WAVEFORM OF FASTER REPRODUCTION THAN NORMAL

FIG. 5

| COMMAND | OPERATION |
|---|---|
| 1# | START REPRODUCTION. |
| 2# | SKIP TO START POSITION OF NEXT VOICED SECTION IN COURSE OF REPRODUCTION. |
| 3# | REPRODUCE BY RAISING REPRODUCTION SPEED (FAST UTTERANCE) IN COURSE OF REPRODUCTION, RETURNS TO NORMAL REPRODUCTION SPEED FROM START POSTION OF NEXT VOICED SECTION, AND RESUME REPRODUCTION. |
| 4# | CONTINUE TO EXECUTE COMMAND 2# UNTIL RECEIVING 4# NEXT. |
| 5# | CONTINUE TO EXECUTE COMMAND 3# UNTIL RECEIVING 5# NEXT. |
| 21# | RETURN OPERATION TO SKIP TO START POSITION OF PRECDING VOICED SECTION IN COURSE OF REPRODUCTON. |
| 31# | RETURN OPERATION TO REPRODUCE REVERSELY BY RAISING REPRODUCTION SPEED IN COURSE OF REPRODUCTION, AND RETURN TO NORMAL DIRECTION AND NORMAL REPRODUCTION SPEED FROM START POSTION OF PRECEDING VOICED SECTION, THEREBY RESUMING REPRODUCTION. |
| 41# | RETURN OPERATION TO CONTINUE TO EXECUTE COMAND 21# UNTIL RECEIVING 41# NEXT. |
| 51# | RETURN OPERATION TO CONTINUE TO EXECUTE COMAND 31# UNTIL RECEIVING 51# NEXT. |
| 7# | NOT REPRODUCE OR DELETE SECTION UNTIL RECEIVING 7# NEXT. |
| 8# | NOT REPRODUCE OR DELETES DATA OF VOICED SECTION BEING REPRODUCED AND OF SILENT SECTIONS BEFORE AND AFTER VOICED SECTION. |
| 9# | STOP REPRODUTION OR RECORDING. |

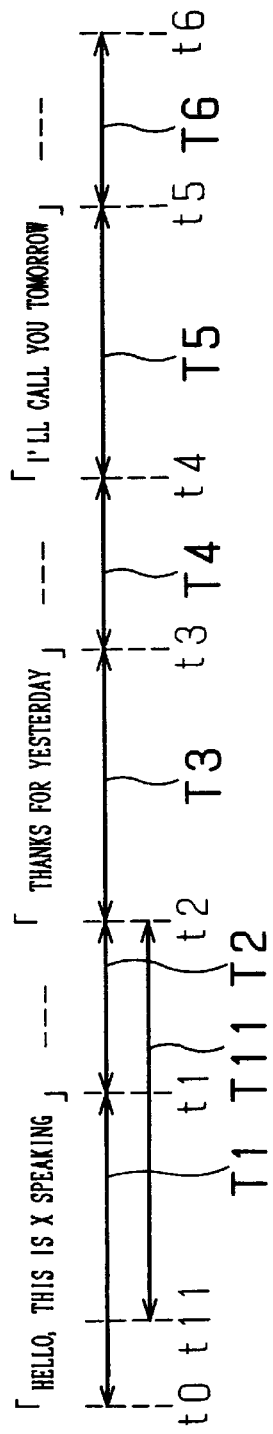
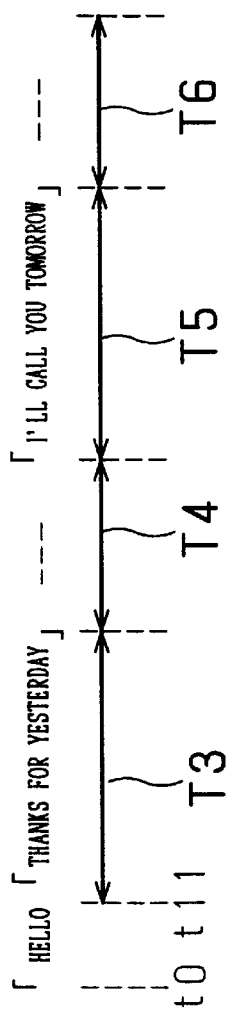
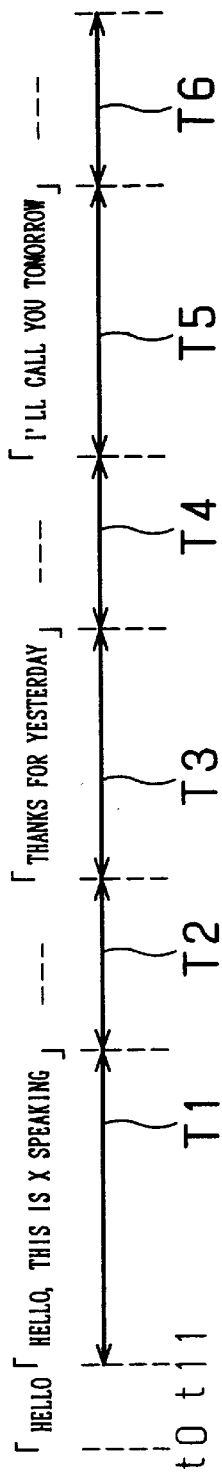

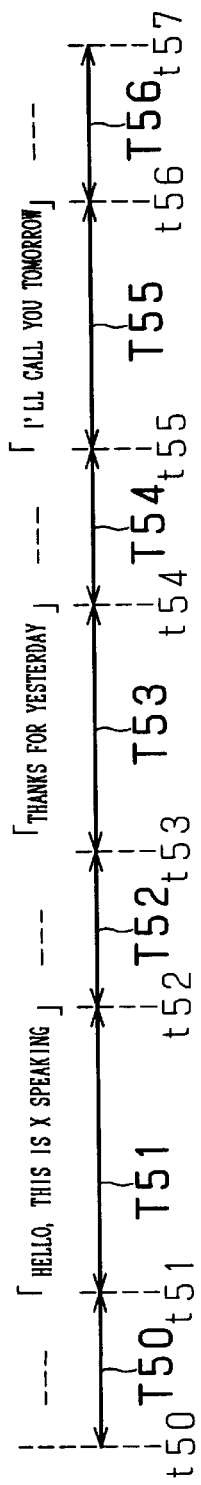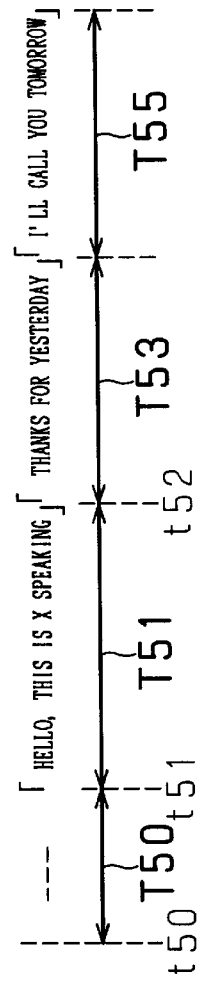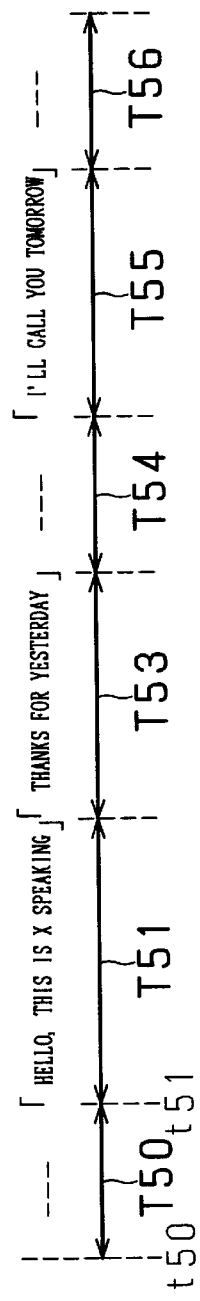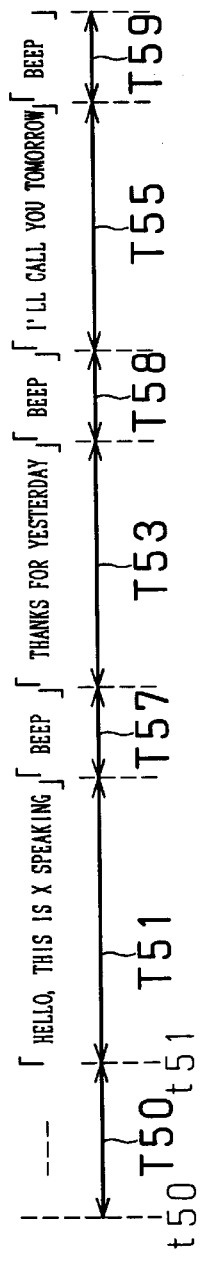

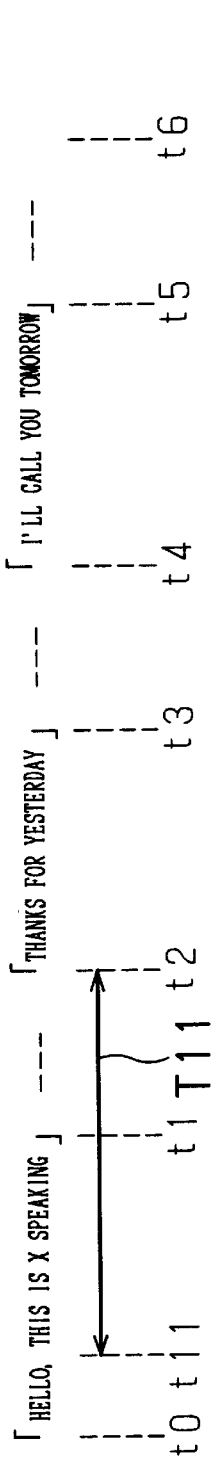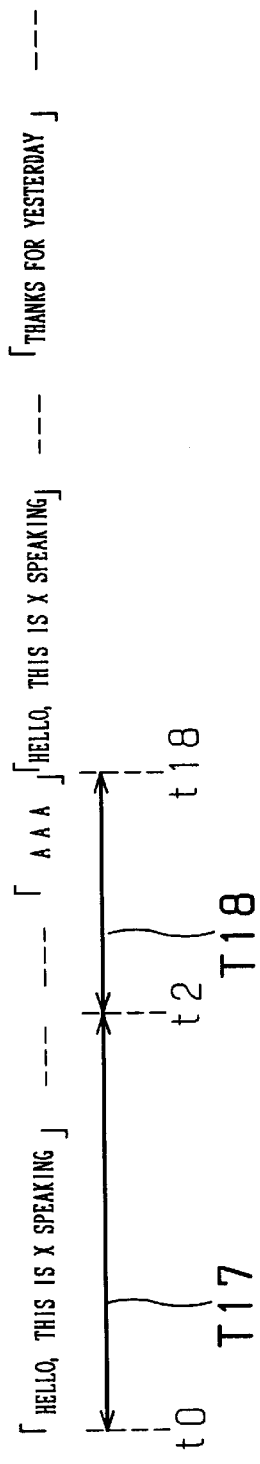

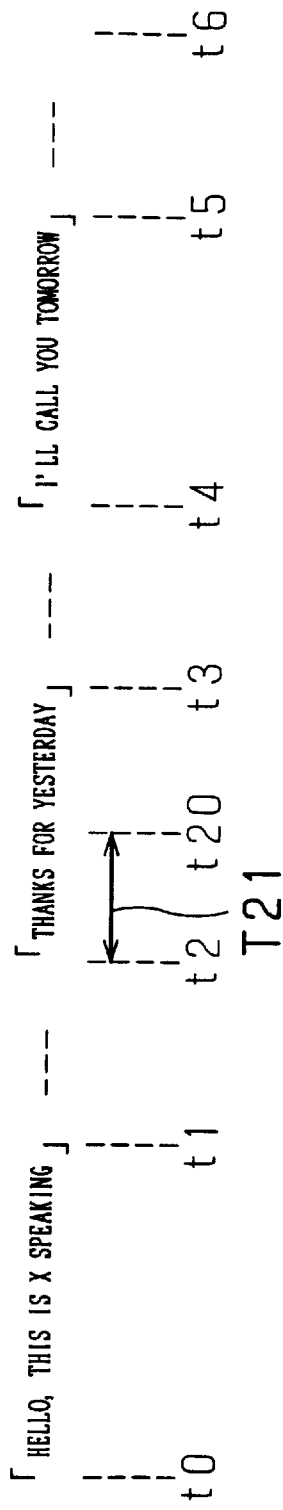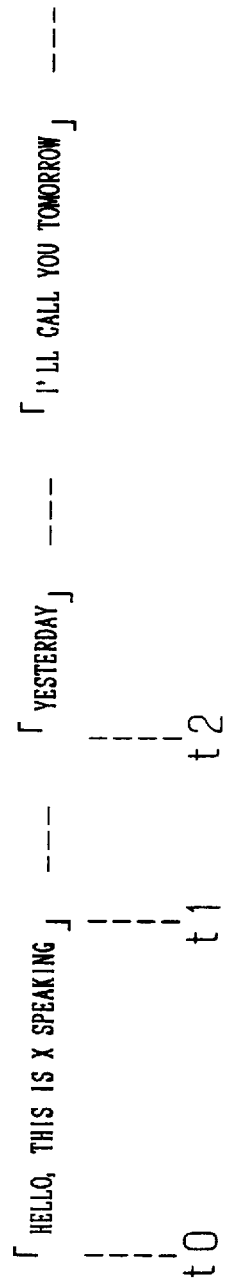

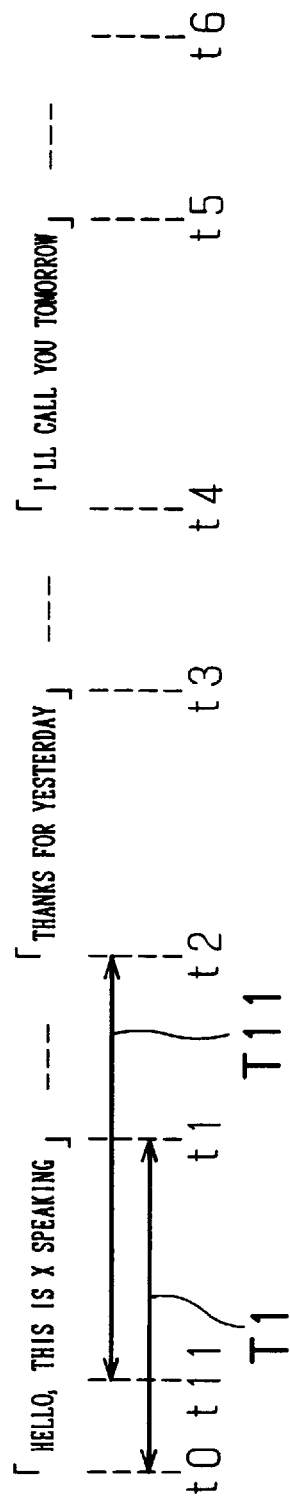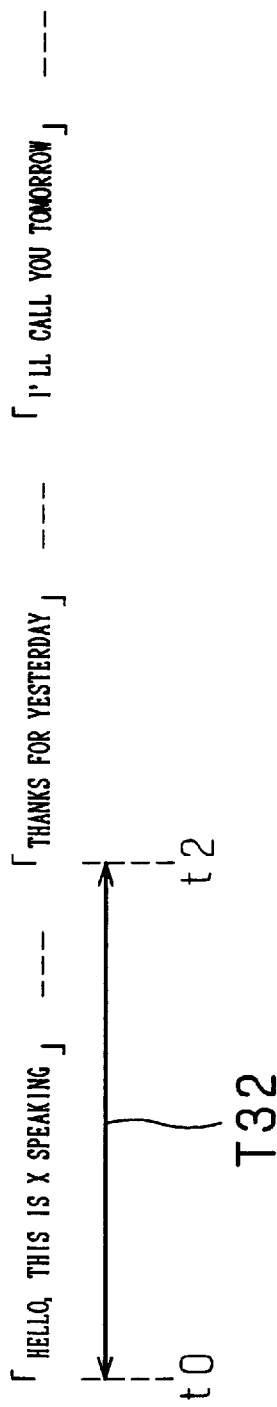

TELEPHONE SET

BACKGROUND OF THE INVENTION

1. Field of the Invention

The present invention relates to a telephone set possessing an automatic answering function known as an automatic answering telephone set.

2. Description of the Related Art

An automatic answering telephone set is an apparatus for sending out an answering message automatically when no one is not available at the telephone at the called side, and recording the message of the caller in a magnetic tape, a voice memory or other storage device, and playing back the message later.

Hitherto, in a general automatic answering telephone set, when reproducing the recorded message, all data are reproduced. The recorded data may sometimes include already known information or information of no interest, and that is a waste of time to hear all message if not necessary for the user. Even if the message is necessary, when a silent section is long, the reproduction time becomes larger for that duration.

The telephone sets saving waste of reproduction time in such conventional automatic answering telephone sets have been disclosed in the following publications. A first telephone set is a telephone set disclosed in Japanese Unexamined Patent Publication JPA 3-186045 (1991). In this telephone set, a clearing signal portion present between a message and the next message is stored when recording, and the clearing signal is skipped when reproducing, thereby shortening the reproduction time.

A second telephone set is a telephone set disclosed in Japanese Unexamined Patent Publication JPA 3-192946 (1991). In this telephone set, a set of ID number and pointer value showing the stored position is stored in every case of messages to be recorded, and a specific recorded message can be selected and reproduced by manipulating a button corresponding to a desired ID number.

In the first telephone, since the clearing signal portion is skipped, and the reproduction time is shortened, but the silent portion in the recorded message is normally reproduced, and the useless time is spent. In the second telephone set, by selecting a desired recorded message to reproduce, undesired messages are not, and the reproduction time is shortened, but the silent portion in the selected message is normally reproduced, which is also a waste of time.

A telephone set capable of saving waste of reproduction time by reproducing the silent portion in such telephone sets is disclosed as a third telephone set in Japanese Unexamined Patent Publication JPA 2-246655 (1990). In this telephone set, digitized voice signal data are not directly recorded, but they are recorded in a storage device after being stored once in a buffer memory. When the data are below a predetermined silence level, the data stored in the buffer memory are discarded, and the silent portion is cut off.

In the third telephone set, since the silent portions of the message are cut off by force, and it may be hard to hear the message.

SUMMARY OF THE INVENTION

It is hence a primary object of the invention to provide a telephone set capable of hearing a necessary portion of a recorded voice message clearly by simple operation.

To achieve the object, the invention provide a telephone set comprising:

automatic answering means for starting to answer after reception of a predetermined number of call signals, sending out an answer message, and then converting a voice message sent out from the caller side into digital data to store in voice data memory means, reproduction means for reading out the digital data from the voice data memory means, and outputting after converting into voice signals, reproduction operation instructing means for instructing to start reproduction of voice signals and skip-reproduce in voice signal reproduction, and discrimination means for discriminating between voiced portions and silent portions of the voice message stored in the voice data memory means, wherein the voice signals are reproduced in response to reproduction start instruction, and when skip reproduction is instructed in course of reproduction, skip reproduction is started on the basis of discrimination results of the discrimination means from the voiced portion unreproduced and closest to the voiced portion or the silent portion in course of reproduction.

In the invention it is preferable that after starting reproduction in response to instruction of skip reproduction, only voiced portions are reproduced.

The invention also provides a telephone set comprising:

automatic answering means for starting to answer after reception of a predetermined number of call signals, sending out an answering message, and then converting a voice message sent out from the caller side into digital data to store in voice data memory means, first reproduction means for reading out the digital data from the voice data memory means, and outputting after converting into voice signals, second reproduction means for reading out the digital data from the voice data memory means at faster speed than that of the first reproduction means, and outputting after converting into voice signal, reproduction operation instructing means for instructing to start reproduction of voice signals and skip-reproduce in voice signal reproduction, and discrimination means for discriminating between voiced portions and silent portions of the voice message stored in the voice data memory means, wherein the voice signals are reproduced in response to reproduction start instruction by the first reproduction means, and when skip reproduction is instructed in course of reproduction, the voice signals are reproduced by the second reproduction means on the basis of discrimination results of the discrimination means up to the start position of the voiced portion unreproduced and closest to the voiced portion or the silent portion in course of reproduction in the case where the skip reproduction is instructed.

In the invention it is preferable that after skip reproduction has been instructed, silent portions are reproduced by the second reproduction means.

Further in the invention, it is preferable that when skip reproduction is instructed in course of reproduction of a voiced portion of the voice message, the voiced portion is reproduced by the first reproduction means, and the subsequent silent portion is reproduced by the second reproduction means.

Further in the invention, it is preferable that the telephone set further comprises reproduction status data memory means for storing a skip-reproduced portion, and the portions of the voice message once skip-reproduced are reproduced in the next reproduction by the second reproduction means.

In the invention, it is preferable that the reproduction status data memory means stores the point of time when skip reproduction was instructed by the reproduction operation instructing means, and the next reproduction is started from this point of time by the second reproduction means.

In the invention, it is preferable that when skip reproduction is instructed by the reproduction operation instructing means in the course of reproduction of a voiced portion of the voice message, the reproduction status data memory means stores the start position of the voiced portion, and in the next reproduction, reproduction from the start position on is carried out by the second reproduction means.

In the invention, it is preferable that the telephone set further comprises reproduction status data memory means for storing portions skip-reproduced, and the portions once skip-reproducted are skipped in the subsequent reproduction by referring to the reproduction status data memory means.

In the invention it is preferable that the telephone set further provided means for erasing reproduction status data stored in the reproduction status data memory means.

In the invention it is preferable that the reproduction operation instructing means instructs reverse reproduction in which reproduction sequence of voice signals is reversed, when reverse reproduction is instructed in course of reproduction, voice signals are reversely reproduced from the position on where the reverse reproduction was instructed by the second reproduction means, and on judging the start position of the closest voiced portion, reproduction is started by the first reproduction means.

In the invention it is preferable that the reproduction operation instructing means comprises analysis means for discriminating the type of reproduction operation on the basis of a DTMF signal received from a telephone circuit and when start of reproduction is instructed by the analysis means, only voiced portions are reproduced In the invention it is preferable that the reproduction operation instructing means comprises analysis means for discriminating the type of reproduction operation on the basis of a DTMF signal received from a telephone circuit, and when start of reproduction is instructed by the analysis means, voiced portions are reproduced by the first reproduction means and silent portions are reproduced by the second reproduction means.

The invention moreover provides a telephone set comprising:

automatic answering means for starting to answer after reception of a predetermined number of call signals, sending out an answering message, and then converting a voice message sent out from the caller side into digital data to store in voice data memory means, reproduction means for reading out the digital data from the voice data memory means, and outputting after converting into voice signals, reproduction operation instructing means for instructing to start reproduction of voice signals and erase voice signals, and reproduction status data memory means for storing reproduction status data showing the reproduction status of voice signals in correspondence to the digital data of the voice data memory means, wherein when erasure is instructed in course of reproduction, erasure data indicating that the instructed voice signal portion is the portion to be erased are stored in the reproduction status data memory means, and when erasure data are detected in course of reproduction, the corresponding digital data are not reproduced.

The invention moreover provides a telephone set comprising:

automatic answering means for starting to answer after reception of a predetermined number of call signals, sending out an answering message, and then converting a voice message sent out from the caller side into digital data to store in voice data memory means, reproduction means for reading out the digital data from the voice data memory means, and outputting after converting into voice signals, reproduction operation instructing means for instructing to start reproduction of voice signals and erase voice signals, and reproduction status data memory means for storing reproduction status data showing the reproduction status of voice signals in correspondence to the digital data of the voice data memory means, wherein when erasure is instructed in course of reproduction, erasure data indicating that the instructed voice signal portion is the portion to be erased are stored in the reproduction status data memory means, and when erasure data are detected in course of reproduction, the corresponding digital data are erased.

The invention moreover provides a telephone set comprising:

automatic answering means for starting to answer after reception of a predetermined number of call signals, sending out an answering message, and then converting a voice message sent out from the caller side into digital data to store in voice data memory means, reproduction means for reading out the digital data from the voice data memory means, and outputting after converting into voice signals, and reproduction operation instructing means for instructing to start reproduction of voice signals and erase voice signals, wherein when erasure is instructed in course of reproduction, the digital data corresponding to the instructed voice signal portion are erased from the voice data memory means.

The invention also provides a telephone set comprising:

automatic answering means for starting to answer after reception of a predetermined number of call signals, sending out an answering message, and then converting a voice message sent out from the caller side into digital data to store in voice data memory means, reproduction means for reading out the digital data from the voice data memory means, and outputting after converting into voice signals, discrimination means for discriminating between voiced portions and silent portions of the voice message stored in the voice data memory means, reproduction operation instructing means for instructing to start reproduction of voice signals and partially erase voice signals, and reproduction status data memory means for storing the reproduction status data showing the reproduction status of a voice signal in correspondence to the digital data of the voice data memory means, wherein when partial erasure is instructed in course of reproduction of a voiced portion, partial erasure data indicating that the voiced portion and the silent portions before and after the voiced portion are the portion to be erased are stored in the reproduction status data memory means, and when partial erasure is instructed in course of reproduction of a silent portion, the partial erasure data indicating that the silent portion is the part to be erased are stored in the reproduction status data memory means, and when partial erasure data are detected in course of reproduction, the corresponding voiced portion and silent portion are not reproduced.

The invention also provides a telephone set comprising:

automatic answering means for starting to answer after reception of a predetermined number of call signals, sending out an answering message, and then converting a voice message sent out from the caller side into digital data to store in voice data memory means, reproduction means for reading out the digital data from the voice data memory means, and outputting after converting into voice signals, discrimination means for discriminating between voiced portions and silent portions of the voice message stored in the voice data memory means, reproduction operation instructing means for instructing to start reproduction of voice signals and partially erase voice signals, and reproduction status data memory means for storing the reproduction status data showing the reproduction status of a voice signal in correspondence to the digital data of the voice data memory means, wherein when partial erasure is instructed in course of reproduction of a voiced portion, partial erasure data indicating that the voiced portion and the silent portions before and after the voiced portion are the portion to be erased are stored in the reproduction status data memory means, and when partial erasure is instructed in course of reproduction of a silent portion, the partial erasure data indicating that the silent portion is the part to be erased are stored in the reproduction status data memory means, and when partial erasure data are detected in course of reproduction, the digital data of the corresponding voiced portion and silent portion are erased.

The invention also provides a telephone set comprising:

automatic answering means for starting to answer after reception of a predetermined number of call signals, sending out an answering message, and then converting a voice message sent out from the caller side into digital data to store in voice data memory means, reproduction means for reading out the digital data from the voice data memory means, and outputting after converting into voice signals, discrimination means for discriminating between voiced portions and silent portions of the voice message stored in the voice data memory means, and reproduction operation instructing means for instructing to start voice signal reproduction and partially erase voice signals, wherein when partial erasure is instructed in course of reproduction of a voiced portion, the digital data corresponding to the voiced portion and the silent portions before and after the voiced portion are erased from the voice data memory means, and when partial erasure is instructed in course of reproduction of a silent portion, the digital data corresponding to the silent portion are erased from the voice data memory means.

In the invention it is preferable that the reproduction operation instructing means indicate erasure data by an operation for showing start of voice signal erasure and an operation for showing termination of voice signal erasure.

In the invention it is preferable that the voice signals in the period when erasure operation is conducted by the reproduction operation instructing means are erasure data.

In the invention it is preferable that the telephone set further comprises means for erasing erasure data stored in the reproduction status data memory means.

In the invention it is preferable that the telephone set further comprises means for erasing partial erasure data stored in the reproduction status data memory means.

According to the invention, the voice message stored by the automatic answering means is converted from voice signals into digital data, and stored in the voice data memory means, and the voice message is discriminated between voiced portions and silent portions by the discrimination means. The stored voice data are reproduced by being inputted into the reproduction means. When skip reproduction is instructed by the reproduction operation instructing means in course of reproduction of a voice message, reproduction is started from the beginning of the next voiced portion, whether the portion of the voice message in course of reproduction is a voiced portion or a silent portion. Therefore, the silent portions and unnecessary voiced portions of the voice message are not reproduced by instructing to skip by the reproduction operation instructing means. In the case where skip reproduction is instructed, skip reproduction starts from the beginning of the next voiced portion, so that all the voiced portions of the voice message can be heard.

More preferably, after skip reproduction has been conducted by the reproduction operation instructing means, the subsequent silent portions are not reproduced, and only voiced portions are reproduced. Therefore, it is not necessary to instruct skip reproduction at least for the silent portions thereafter. Additionally since the silent portions are not reproduced, the time expended in reproducing is reduced.

According to the invention, moreover, when skip reproduction is instructed by the reproduction operation instructing means in course of reproduction of voice message, the portion of the voice message ranged from the instructed position up to the start position of the next voiced portion is reproduced by the second reproduction means. Therefore, the silent portion and the voiced portion of the voice message up to the start position of the next voiced portion are reproduced at raised reproduction speed as being instructed by the reproduction operation instructing means, and hence the reproduction time is shortened. Still more, when skip reproduction is instructed by the reproduction operation instructing means in course of reproduction of a voiced portion, the voiced portion is reproduced by the first reproduction means, and the subsequent silent portion is reproduced by the second reproduction means. Since the silent portion before the start position of the next voiced portion is reproduced at faster reproduction speed than usual, so that the reproduction time is also shortened.

Preferably, after instruction of skip reproduction by the reproduction operation instructing means, the subsequent silent portions are reproduced at raised reproduction speed by the second reproduction means. Therefore, it is unnecessary to instruct skip instruction at least for the subsequent silent portions. Additionally since the reproduction time of the silent portions is shortened, the amount of time expended in reproducing can be totally curtailed.

More preferably, when skip reproduction is instructed by the reproduction operation instructing means in course of reproduction, the skip-reproduced portion is stored in the reproduction status data memory means, and, at the time of reproduction, the skip-reproduced portion is reproduced by the second reproduction means. Therefore, once skip reproduction is instructed, the portion to which skip reproduction was instructed at the previous reproduction is skipped in the next reproduction, and it is not necessary to repeat the same operation for skip reproduction in every reproduction, and the amount of labor expended in operating is saved. At the same time, the reproduction time is shortened. Moreover, by storing the start position of the voiced portion of the voice message in the reproduction status data memory means, the voiced portion judged to be unnecessary by a user is not reproduced at all, and hence the reproduction time can be shortened. Incidentally, in the case of skip reproduction on the basis of the reproduction status data stored in the reproduction status data memory means, if reproduced by the second reproduction means, the voiced data portion can be skipped.

More preferably, the reproduction status data stored in the reproduction status data memory means can be erased, and if necessary, all voice message can be heard.

More preferably, when reverse reproduction is instructed by the reproduction operation instructing means, the voice message is reproduced in reverse direction to that of normal reproduction by the second reproduction means from the position where the reverse reproduction was instructed to the start position of the closest voiced portion, and from this start position, normal reproduction is started by the first reproduction means. Therefore, in course of the reverse reproduction, the sound signals outputted, and the content can be detected by the sound. Besides, since the reverse reproduction is carried out by the second reproduction means, the time necessary for retrieval can be shortened.

More preferably, when start of reproduction is instructed by the DTMF signal inputted through a telephone circuit, only the voiced portions of the voice message are reproduced. Therefore, when hearing the stored voice message by operating the telephone set from outside, only by instructing to start reproduction, the silent portions are skipped, and only the voiced portions are reproduced, so that extra labor expended in operation can be saved. That is, the operation time is saved and the reproduction time is shortened, so that the duration of a call from outside is curtailed.

Further preferably, when start of reproduction is instructed by the DTMF signal inputted through a telephone circuit, the voiced portions of the voice message are reproduced by the first reproduction means, and the silent portions of the voice message are reproduced by the second reproduction means. Therefore, when hearing the stored voice message by operating the telephone set from outside, only by instructing to start reproduction, the voiced portions are reproduced by the first reproduction means, while the silent portions are reproduced at raised speed by the second reproduction means, so that extra labor expended in operation can be saved. That is, the operation time is saved and the reproduction time is shortened, so that the duration of a call from outside is curtailed.

Further according to the invention, in course of reproduction of a voice message, when the user considers a part of the voice message is not necessary, by instructing to erase by the reproduction operation instructing means, the erasure data indicating that the part of the voice message is a part to be erased are stored in the reproduction status data memory means, in correspondence to the part of the voice message. In course of reproduction of the voice message, if it is detected that a part of the voice message in course of reproduction is contained in the erasure data, the digital data corresponding to the part of the voice message is not inputted into the reproduction means. Therefore, by instructing the unnecessary part of the message in course of reproduction of the voice message, the unnecessary portion is not reproduced from the next reproduction, so that the reproduction time can be shortened. Incidentally, since the erasure data are stored in the reproduction status data memory means, it is not necessary to repeat the same operation every reproduction of voice message.

Further according to the invention, in course of reproduction of a voice message, when the user considers a part of the voice message is not necessary, by instructing to erase by the reproduction operation instructing means, the part of the voice message of which erasure is instructed is stored, and the digital data corresponding to the part of the voice message are erased from the voice data memory means at the time of the next reproduction. Therefore, by instructing an unnecessary part during reproduction of voice message, the unnecessary part is not reproduced from the next reproduction, so that the reproduction time can be shortened.

Further according to the invention, in course of reproduction of a voice message, when the user considers a part of the voice message portion is not necessary, by instructing to erase by the reproduction operation instructing means, the digital data corresponding to the part of the voice message of which erasure is instructed are erased from the voice data memory means. Therefore, by instructing the unnecessary part of the voice message in course of reproduction of the voice message, the digital data corresponding to the part of the voice message instructed are deleted, so that the reproduction time can be shortened from the next reproduction.

Also according to the invention, in course of reproduction of a voice message, when the user considers the voice message portion is not necessary, by instructing partial erasure by the reproduction operation instructing means, if the partial erasure is instructed in course of reproduction of a voiced portion, the voiced portion and the silent portions before and after the voiced portion are not reproduced from the next reproduction. When the partial erasure is instructed in course of reproduction of a silent portion, the silent portion is not reproduced from the next reproduction. Therefore, when the voiced portion was partially erased, the silent portions before and after the voiced portion are not reproduced, so that the operation for erasing the silent portions may be saved.

Also according to the invention, in course of reproduction of a voice message, when the user considers a part of the voice message is not necessary, by instructing partial erasure by the reproduction operation instructing means, if the partial erasure is instructed in course of reproduction of a voiced portion, the partial erasure data indicating that the voiced portion and the silent portions before and after the voiced portion are the part to be erased are stored in the reproduction status data memory means, and when the partial erasure data are detected in course of reproduction of the voice message, the corresponding digital data are erased from the voice data memory means. When the partial erasure is instructed in course of reproduction of a silent portion, that the silent portion is the part to be erased is stored in the reproduction status data memory means, and when the partial erasure data are detected at the time of reproduction, the corresponding digital data are erased from the voice data memory means. Therefore, when the voiced portion is partially erased, the silent portions before and after the voiced portion are similarly erased at the time of the next reproduction, and therefore the labor expended in erasing operation is saved, and the memory region in the voice data memory means can be utilized effectively. Besides, in reproduction after the reproduction by erasure operation, the reproduction time can be curtailed.

Also according to the invention, in course of reproduction of a voice message, when the user considers a part of the voice message is not necessary, by instructing partial erasure by the reproduction operation instructing means, if partial erasure is instructed in course of reproduction of a voiced portion, the digital data corresponding to the voiced portion and silent portions before and after the voiced portion are erased from the voice data memory means. If the partial erasure is instructed in course of reproduction of a silent portion, the digital data corresponding to the silent portion are erased from the voice data memory means. Therefore, when the voiced portion is partially erased, the silent portions before and after the voiced portion are similarly erased, and therefore the memory region in the voice data memory means can be utilized effectively. Besides, the time expended in the successive reproductions after the reproduction where the erasure operation was once conducted can be curtailed.

Preferably, the invention further comprises means for erasing the erasure data and partial erasure data stored in the reproduction status data memory means. Therefore, even in the case where the user considered the data to be unnecessary and operated to erase, the voice message can be heard again if that is before the data is erased from the voice data memory means.

Thus, according to the invention, reproduction is stopped once by instructing skip reproduction by the reproduction operation instructing means in course of reproduction of a stored voice message, and reproduction is resumed from the start position of the next voiced portion, so that the reproduction time can be shortened, while the controllability may be enhanced. The skip reproduction is done only when instructed by the reproduction operation instructing means, only the section not desired to be reproduced can be skipped.

Also according to the invention, after skip reproduction, the subsequent silent portions are automatically skipped, and hence the reproduction time can be shortened. Besides, it is not necessary to instruct skip reproduction every time desired to skip silent portions, and hence the labor expended in operation can be saved.

Further according to the invention, when skip reproduction is instructed by the reproduction operation instructing means, reproduction is conducted at raised reproduction speed by the second reproduction means up to the start position of the next voiced portion, and from this start position, the reproduction is done at normal speed by the first reproduction means, and therefore the reproduction time is shortened and the controllability is enhanced. Besides, since reproduction at raised reproduction speed is conducted only when instructed by the reproduction operation instructing means, the section not desired to be heard can be reproduced fast. When skip reproduction is instructed in course of reproduction of voiced portion, this voiced portion is reproduced by the first reproduction means, and the successive silent portion may be reproduced by the second reproduction means.

Also according to the invention, after skip reproduction, the subsequent silent portion is automatically reproduced at raised reproduction speed, and therefore the reproduction time is shortened. Additionally, it is not necessary to instruct skip reproduction on every occasion of reproduction of silent portions at raised reproduction speed, and the labor expended in operation is saved.

Also according to the invention, since by storing the portion instructed to be skip-reproduced into the reproduction status data memory means, the portion skip-reproduced in previous reproduction is reproduced at raised reproduction speed or skip-reproduced by the second reproduction means without another instruction, and it is not necessary to give the same instruction in every reproduction, and the ease of operation is enhanced. As a result, the time expended in operation and reproduction is curtailed.

Also according to the invention, the reproduction status data of a message stored in the reproduction status data memory means can be erased, and if the user considers the voice message necessary, all voice message can be heard.

Also according to the invention, when reverse reproduction is instructed by the reproduction operation instructing means in course of reproduction of a stored voice message, the voice message is reproduced at raised reproduction speed in reverse direction back to the start position of the voiced portion from the position where the reverse reproduction was instructed, so that a desired part of the voice message can be retrieved easily.

Also according to the invention, when reproduction start is instructed by a DTMF signal inputted through a telephone circuit, only the voiced portion in the voice message is reproduced, and the labor in operation can be saved. That is, no time is expended in the operation for skip reproduction, and the reproduction time is shortened, so that the duration of a call from outside can be shortened.

Also according to the invention, when reproduction start is instructed by the DTMF signal inputted through a telephone circuit, the voiced portion in the voice message is reproduced at normal reproduction speed by the first reproduction means, while the silent portion is reproduced at raised speed by the second reproduction means, and the labor expended in operation can be saved. That is, the operation time for skip reproduction is not necessary, and the reproduction time is shortened, so that the duration of a call from outside can be shortened.

Further according to the invention, when erasure is instructed by the reproduction operation instructing means during reproduction of stored voice message, the erasure data are stored in the reproduction status data memory means, and the voice message corresponding to the erasure data is not reproduced, and therefore the time expended in the subsequent reproduction after the reproduction with erasure operation can be shortened. Besides, since the erasure data are stored in the reproduction status data memory means, it is not necessary to repeat the same operation, and labor of operation can be saved.

Further according to the invention, when erasure is instructed by the reproduction operation instructing means in course of reproduction of a stored voice message, a part of the voice message which is instructed to be erased is stored, and the digital data corresponding to the part of the voice message portion are erased from the voice data memory means at the time of the next reproduction, and hence the capacity of the voice data memory means can be saved. The time expended in the subsequent reproduction after the reproduction with erasure operation is shortened.

Further according to the invention, when to erase a part of a voice message is instructed by the reproduction operation instructing means in course of reproduction of a stored voice message, the digital data corresponding to the part of the voice message of which erasure is instructed are erased from the voice data memory means, and hence the capacity of the voice data memory means can be saved. The time expended in the subsequent reproduction after the reproduction with erasure operation is shortened. Moreover, by installing means for erasing the erasure data, the voice message can be heard again if it is before the corresponding digital data are erased.

Also according to the invention, when partial erasure is instructed by the reproduction operation instructing means, if a voiced portion is being reproduced, this voiced portion and silent portions before and after the voiced portion are not reproduced from the next reproduction, and if a silent portion is being reproduced, this silent portion is not reproduced from the next reproduction on, and therefore the time expended in the subsequent reproduction after the reproduction with erasure operation can be shortened. Since the erasure data are stored in the reproduction status data memory means, it is not necessary to repeat the same operation, and extra labor of operation can be saved.

Also according to the invention, since in the case where a voiced portion is being reproduced at the time when partial erasure is instructed by the reproduction operation instructing means, the partial erasure data showing that the voiced portion and silent portions before and after the voiced portion are the part to be erased are stored in the reproduction status data memory means, and in the case where a silent portion is being reproduced, that the silent portion is the part to be erased is stored in the reproduction status data memory means, and when the partial erasure data are detected at the time of reproduction, the corresponding digital data are similarly erased from the voice data memory means, the capacity of the voice data memory means can be saved. The time expended in the subsequent reproduction after the reproduction with erasure operation is shortened.

Also according to the invention, when partial erasure is instructed by the reproduction operation instructing means, if a voiced portion is being reproduced, the digital data corresponding to the voiced portion and silent portions before and after the voiced portion are erased from the voice data memory means, and if a silent portion is being reproduced, the digital data corresponding to the silent portion is similarly erased, and therefore the capacity of the voice data memory means can be saved. The time expended in the subsequent reproduction after the reproduction with erasure operation is shortened. Moreover, by installing means for erasing the erasure data, the voice message can be heard again if it is before the corresponding digital data are erased.

BRIEF DESCRIPTION OF THE DRAWINGS

Other and further objects, features, and advantages of the invention will be more explicit from the following detailed description taken with reference to the drawings wherein:

FIGS. 3A, 3B, 3C and 3D, and FIGS. 4A and 4B are diagrams explaining the reproduction operation of the telephone set 51;

FIG. 5 is a diagram showing the correspondence between an operation and a command inputted when controlling the telephone set 51 through a telephone circuit 13;

FIGS. 9A, 9B and 9C are timing charts when reproducing a message in the telephone set 51;

FIGS. 13A, 13B, 13C and 13D are timing charts when reproducing a message in a telephone set 52a of a third embodiment of the invention;

FIGS. 14A, 14B and 14C are timing charts when reproducing a message in a telephone set 53 of a fourth embodiment of the invention;

FIGS. 19A and 19B are timing charts of partial erasure operation in a telephone set 56 of a seventh embodiment of the invention;

FIGS. 28A and 28B are timing charts when reproducing a message in a telephone set 60 of an eleventh embodiment of the invention;

DETAILED DESCRIPTION OF THE PREFERRED EMBODIMENTS

Figure 1:
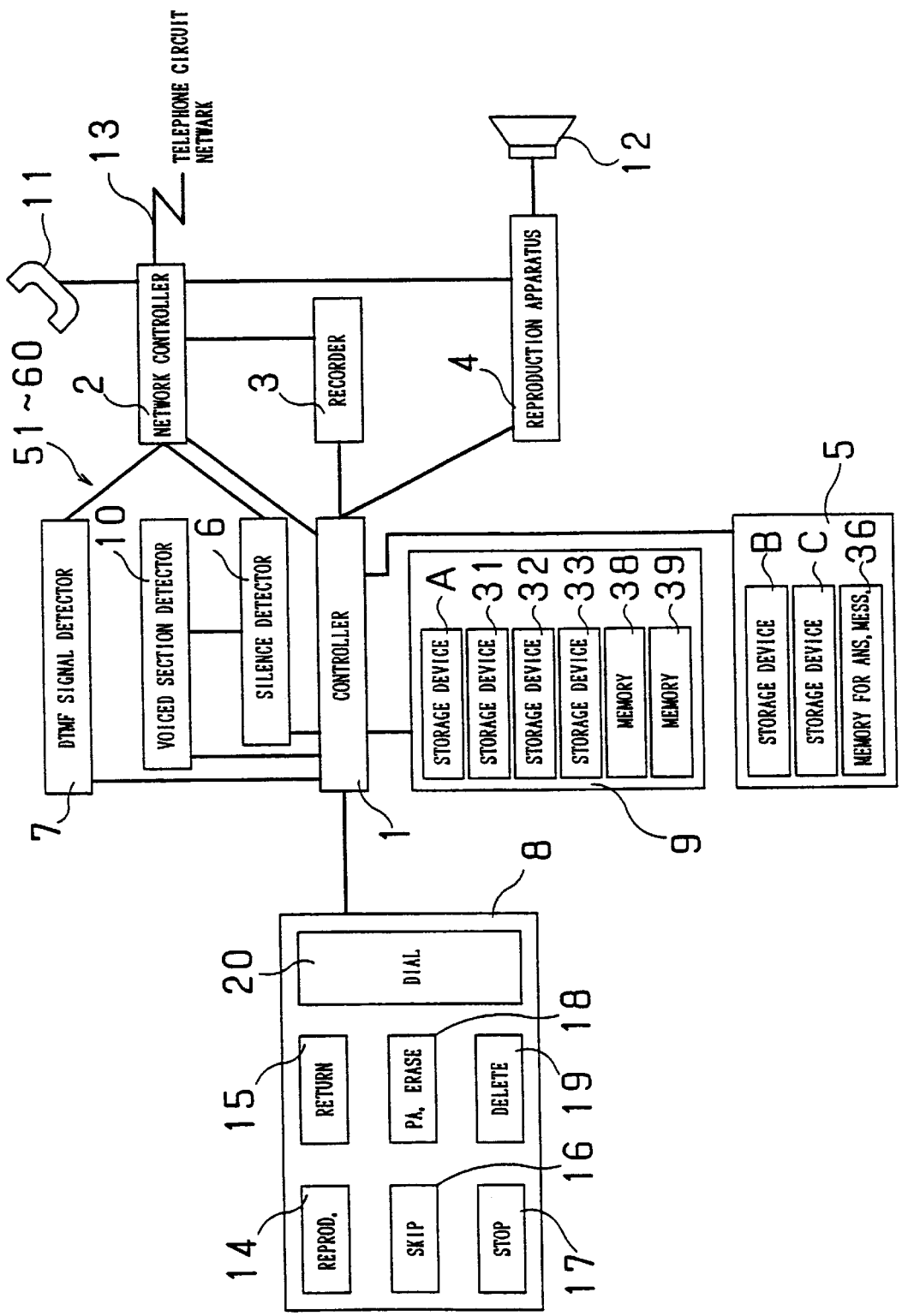
FIG. 1 is a block diagram showing an electric constitution of a telephone set 51 of a first embodiment of the invention.

Now referring to the drawings, preferred embodiments of the invention are described below.

FIG. 1 is a block diagram showing an electrical constitution of a telephone set 51 of a first embodiment of the invention. The telephone set 51 mainly comprises a controller 1, a network controller 2, a recorder 3, a reproduction apparatus 4, a data storage device 5, a silence detector 6, a DTMT (dual tone multi-frequency) signal detector 7, a group of operation buttons 8, a storage device 9, a voiced section detector 10, a handset 11, and a speaker 12.

The controller 1 controls the following devices in the telephone set 51. The network controller 2 controls connection between a telephone circuit network 13 and the telephone set 51, and is responsible for inputting and outputting a voice signal.

The recorder 3 converts an analog voice signal inputted from the telephone circuit network 13 through the network controller 2 into voice data of digital signals, and feeds into the controller 1.

The voice signal is divided into tiny sections of about 10 to 100 ms called frames, and is converted into voice data in each frame. The voice data of each frame is stored in a storage device B described later. Each frame requires a memory region of about 10 to 100 bytes.

The reproduction apparatus 4 converts the voice data inputted from the controller 1 into a voice signal, and outputs into the network controller 2 and the speaker 12. From the speaker 12, an acoustic output on the basis of the voice signal is delivered.

The voice data storage device 5 mainly comprises a storage device B, a storage device C, and an answer message memory 36. The storage device 9 mainly comprises a storage device A, memory devices 31, 32 and 33, a region number memory 38, and a reproduction state memory 39.

The storage device B stores the voice data in every message (a message is one item of voice data stored by one answer), and the stored voice data are read out by the controller 1, and outputted into the reproduction apparatus 4. When a voiced section of which the voice level is more than a predetermined value, and the start of the silent section of which the voice level is less than the predetermined value are detected by the voiced section detector 10 and the silence detector 6, respectively, the storage device C stores as one set the memory start positions of voiced and silent sections in the storage device B, and information showing whether the stored period is a voiced section or a silent section. The storage device A in the storage device 9 stores the data storage start position of voice data of each message stored in the storage device B, the size of the voice data being stored, and the storage start date. The memory devices 31, 32 and 33, the region number memory 38, and the reproduction state memory 39 are described later.

Figure 2:
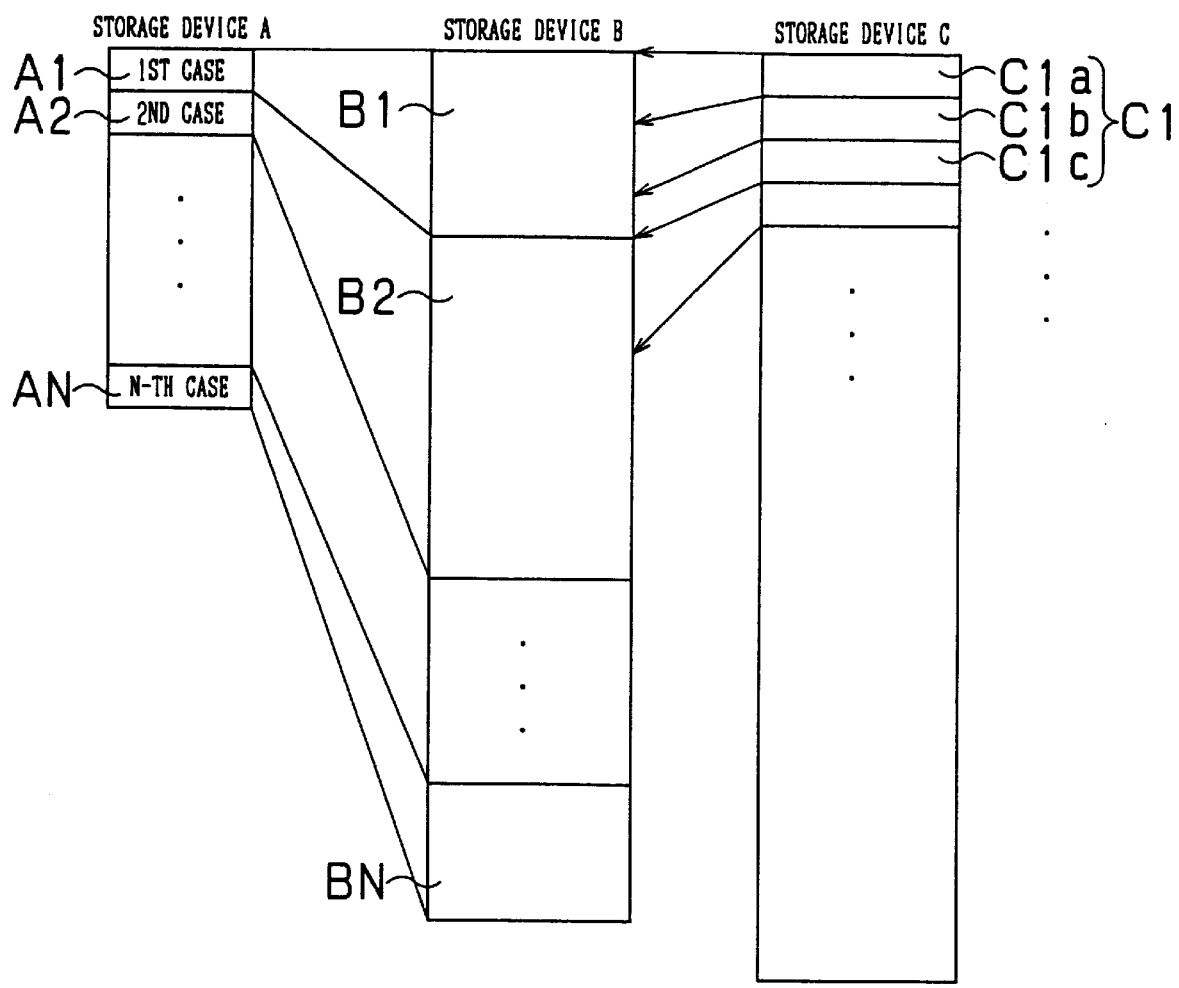
FIG. 2 is a diagram showing the constitution of memory devices A, B and C in the telephone set 51.
Figure 4A:
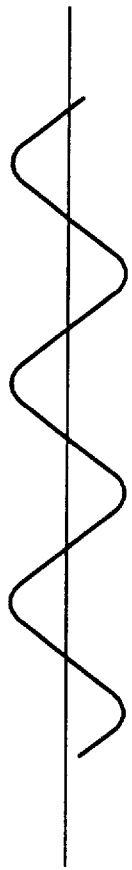
Figure 4B:
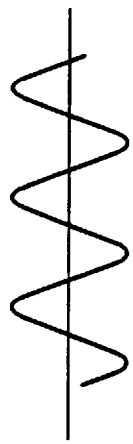

FIG. 2 is a diagram showing the composition of the data stored in the storage device A, the storage device B, and the storage device C. The storage device B is composed of regions B1, B2, . . . , BN (N is a number determined by the capacity of the storage device B and the magnitude of data per case), and one region is used for one case of message. The voice data are stored on the basis of the frame. The size of each region is determined by the length of the message. Likewise, the storage device A is composed of regions A1, A2, . . . , AN, and the region A1 stores the data storage start position of region B1, data size, and start date of memory of message in the region B1, among others. Every time a message is stored in the storage device B, data are stored in each region of the storage device A. In the storage device C, plural regions are set for each case of message, and in the region B1, for example, regions C1a, C1b and C1c (collectively indicated by reference code C1) are set.

Referring back to FIG. 1, when the level of a voice signal supplied from the network controller 2 is less than a predetermined value for more than a predetermined duration, the silence detector 6 judges the signal to be of a silent section, when the level of the voice signal and sends out a silent section detection signal showing the data stored in the storage device B are silence data, to the voiced section detector 10. When a silence detection signal is inputted from the silence detector 6, the voiced section detector 10 sends out the silent section detection signal to the controller 1, and when such silent section detection signal is not inputted, judging the signal to be of a voiced section, it sends out a voiced section detection signal to the controller 1.

The DTMF signal detector 7 converts the DTMF signal to a corresponding code and sends out to the controller 1 when the voice signal supplied from the network controller 2 is a DTMF signal.

The group of operation buttons 8 includes a reproduction start button 14, a return button 15, a skip operation button 16, a stop button 17, a partial erase button 18, a delete button 19, and a dial button 20. The dial button 20 is composed of plural buttons, including, for example, numeric buttons 0 to 9, and symbol buttons * and #. A calling number is inputted using numeric buttons, and when combined with a symbol button, a DTMF signal is outputted, and the telephone set 51 can be controlled.

FIGS. 3A to 3D, and FIGS. 4A and 4B are diagrams for explaining the reproduction operation in the telephone set 51. As shown in FIG. 3A, the voice data converted into digital signals in units of the frame are supposed to be stored as frames f0 to f7 in the storage device B. In normal reproduction, the data are read out and reproduced sequentially from a frame 0.

As described below, when reproducing the message by raising the reproduction speed, as shown in FIG. 3B, for example, the frames f0, f2, f4 and f6 are read out from the storage device B, and reproduced. In the example shown in FIG. 3B, since voice data are reproduced in every other frame stored in the storage device B, the reproduction speed is twice faster than that when reproducing all of the frames f0 to f7 sequentially. As mentioned below, when reproducing the message reversely, it is designed to read out and reproduce sequentially from the frame f7 to the frame f0 as shown in FIG. 3D, not reading out and reproducing sequentially from the frame f0 as shown in FIG. 3C.

As a method of reproducing by raising the reproduction speed, a different method from the one shown in FIG. 3B is described below. When the message is converted into digital signals according to the waveform shown in FIG. 4A, and stored in the storage device B, by converting the digital signals into an analog signal according to the waveform shown in FIG. 4A and reproducing, the message can be heard at the speed when recorded. Instead, when the digital signal is converted into analog signal on the basis of the waveform shown in FIG. 4B higher in frequency than the waveform shown in FIG. 4A, the message can be heard by raising the reproduction speed. For example, when the frequency used as a reference in conversion is twice higher, the reproduction speed is also twice higher.

FIG. 5 is an example showing the corresponding relation of operation and commands inputted when controlling the telephone set 51. By using each command shown in FIG. 5, the message can be heard without directly manipulating the buttons in the group of operation buttons 8. For example, by giving a command to the telephone set 51 through a telephone circuit network 13 from other telephone when going out, the message can be heard through the telephone circuit network 13.

When a reproduction start command 1# is inputted, reproduction of recorded message starts. When a skip operation command 2# is inputted in course of message reproduction, skipping over to the next voiced section start position, reproduction is started from the start position of the next voiced section. When a skip operation command 3# is inputted in course of message reproduction, the reproduction speed is raised to reproduce, and from the start position of next voiced section, the reproduction speed is returned to normal to reproduce.

When a skip operation command 4# is inputted, only the voiced portion is reproduced until the skip operation command 4# is inputted again. When a skip operation command 5# is inputted, the reproduction speed is raised to reproduce until the skip operation command 5# is inputted again, and after the second input of the skip operation command 5#, the reproduction speed is returned to normal to reproduce.

When a return command 21# is inputted in course of message reproduction, the reproduction is stopped, and, skipping to the immediately preceding start position of voiced section, reproduction is resumed. When a return command 31# is inputted, the reproduction speed is raised to reproduce in the reverse direction back to the preceding start position of voiced section, and then the reproduction speed is returned from the start position of the voiced section to reproduce in normal direction.

When a return command 41# is inputted in course of reproduction of message, skip to the start position of the previous voiced section is done and reproduction is resumed. When reproduction of the section from the start position of this voiced section is over, skipping to the start position of further previous voiced section and reproduction is resumed. The same operation is repeated as far as there is a voiced section. During this operation, if the return command 41# is inputted again, the reproduction is terminated. When a return command 51# is inputted, the reproduction speed is raised from the present reproduction position to reproduce in the reverse direction, and the reproduction speed is returned to the normal speed from the start position of the closest voiced section to reproduce in the normal direction. When reproduction of the section from the start position of the pertinent voiced section is over, the reproduction speed is raised to reproduce in the reverse direction, and the reproduction speed is returned from the start position of voiced section existing before the start position of this voiced section, thereby reproducing in the normal direction. Thereafter, the same operation is repeated as far as there is a voiced section. In course of this operation, if the return command 51# is inputted once, the reproduction is over.

When a partial erase operation command 7# is inputted in course of message reproduction, the section is stored until the partial erase operation command 7# is inputted again, so as not to reproduce from the next reproduction on. The section of partial erase operation may be deleted from the storage device B. When a clause delete operation command 8# is inputted in course of message reproduction, if the section being reproduced is a voiced section, this voiced section and silent sections before and after the voiced section are not reproduced from the next reproduction on. If the section being reproduced is a silent section, this silent section is not reproduced from the next reproduction on. The section for which clause delete operation was conducted may be deleted from the storage device B. When a stop command 9# is inputted, operation of reproducing and recording is stopped.

Figure 6:
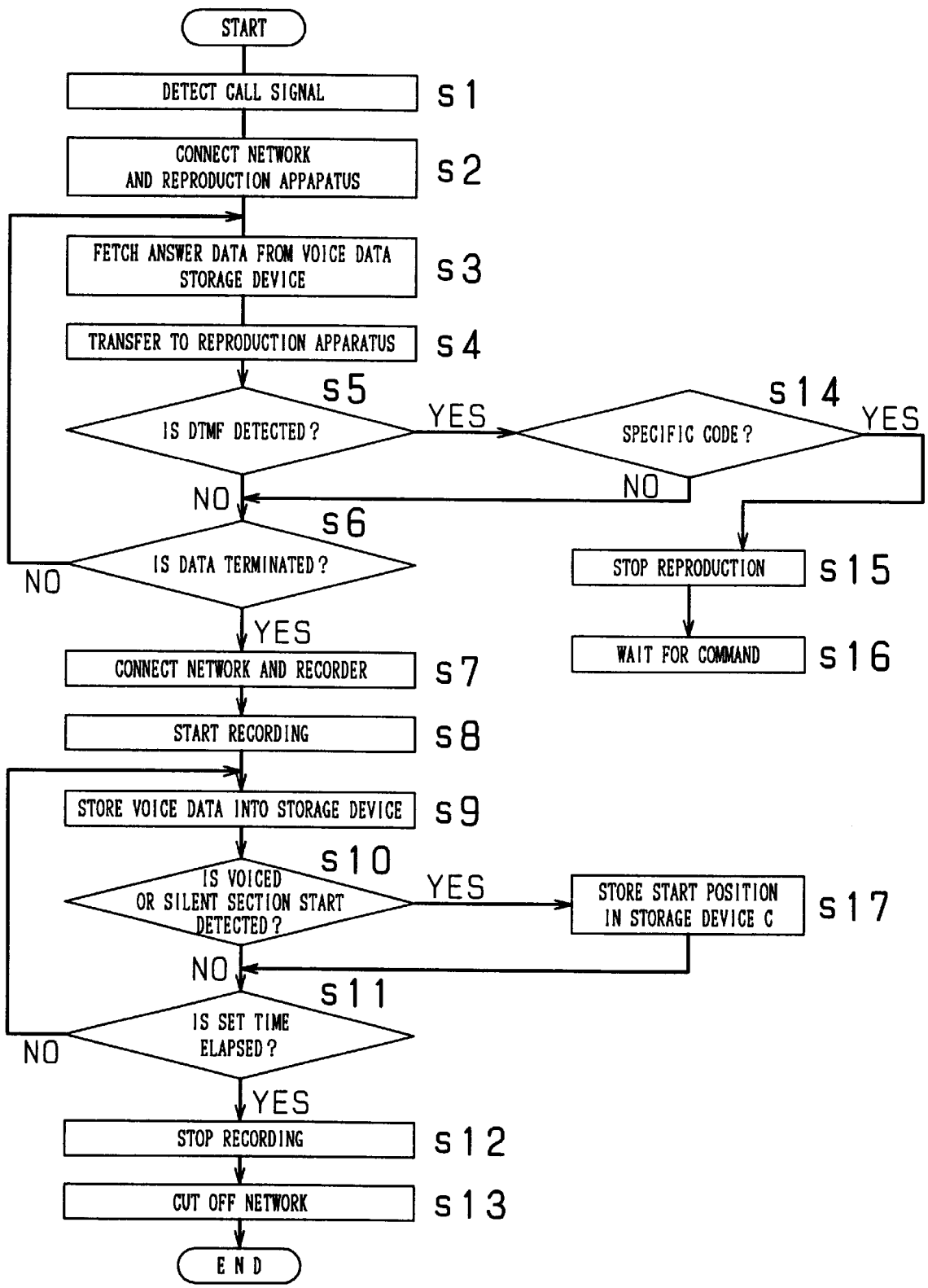
FIG. 6 is a flowchart when recording a message in the telephone set 51.

FIG. 6 is a flowchart for recording a message in the telephone set 51. When at step s1 a call signal from the telephone circuit network 13 is detected by the network controller 2, at step s2 the network controller 2 connects the reproduction apparatus 4 and the telephone circuit network 13 so that the voice signal supplied from the reproduction apparatus 4 may be sent out to the telephone circuit network 13. At step s3 the voice data of the answer message are read out from an answer message memory 36 in which the answer message is stored as voice data in the voice data storage device 5 by the instruction of the controller 1. At consequent step s4, the read voice data are inputted into the reproduction apparatus 4. The voice data which are the digital data fed into the reproduction apparatus 4 are converted into analog voice signal, and sent out into the telephone circuit network 13.

At step s5, it is judged whether the DTMF signal detector 7 detected the DTMF signal while sending out the answer message converted into voice signal. When a DTMF signal is not detected, the operation advances to step s6. At step s6, it is judged whether all answer messages have been sent out to the telephone circuit network 13. When answer messages are completely sent out, the operation advances to step s7. At step s7, the network controller 2 and recorder 3 are connected so that the voice signal given through the telephone circuit network 13 may be inputted into the recorder 3. At subsequent step s8, to store the input voice signal into the voice data storage device 5, it is converted into voiced data in the recorder 3, and is inputted into the controller 1. At subsequent step s9, the voice data are sent from the controller 1 into the storage device B of the voice data storage device 5 to be stored.

Simultaneously when the voice data are recorded, the silence detector 6 judges if the voice signal being recorded is voiced or silent, on the basis of the voice signal supplied from the network controller 2. At step s10, it is judged whether start of voiced or silent section is detected or not. If start of voiced or silent section is not detected, the operation advances to step s11. At step s11, it is judged whether a predetermined recording time for one case is over or not. When the recording time is over, the operation advances to step s12. At step s12, recording is stopped, and at subsequent step s13, the telephone circuit network 13 and the network controller 2 are disconnected, and the telephone circuit 51 is disconnected from the telephone circuit network 13, thereby finishing the process.

If a DTMF signal is detected at step s5, the operation skips to step s14. At step s14, it is judged whether the detected DTMF signal is a specific code predetermined by the user or not. If the detected DTMF signal is not specific code, the process following step s6 is executed. If it is a specific code, the operation advances to step s15. At step s15, reproduction of answer message is stopped, thereby going to step s16 to wait for input of a command.

At step s10, detection of start of voiced or silent section causes to advance to step s17. At step s17, the start position of voiced or silent section is stored in the storage device C. After storing, the process following step s11 is executed. In the telephone set 51, in order to prevent other persons than the user from manipulating the telephone 51 through the telephone circuit network 13, the input of each command is accepted only when a specific code is inputted.

Figure 7:
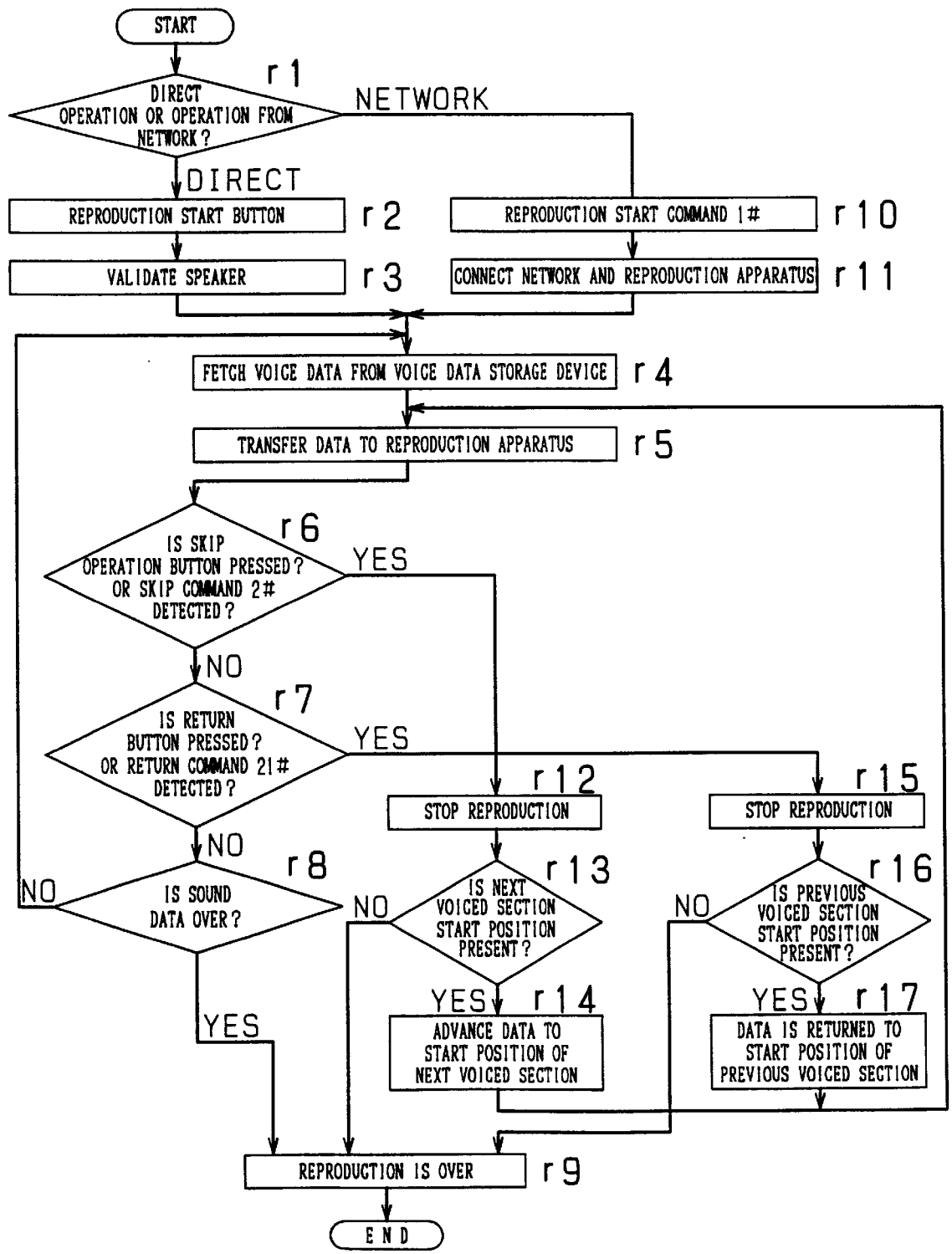
FIG. 7 is a flowchart when reproducing a message in the telephone set 51.

FIG. 7 is a flowchart when reproducing a message in the telephone set 51. At step r1, it is judged whether to manipulate the telephone set 51 directly, or to manipulate by feeding a DTMF signal through the telephone circuit network 13. When manipulating the telephone set 51 directly, the operation advances to step r2. At step r2, when the reproduction start button 14 is pressed, at subsequent step r3, the connection route between the reproduction apparatus 4 and the speaker 12 is validated so that the message from the speaker 12 may be outputted as an acoustic output.

At step r4, voice data are read out from the storage device B of the voice data storage device 5, and at subsequent step r5, this voice data are inputted into the reproduction apparatus 4. As the voice data are supplied into the reproduction apparatus 4, the message is reproduced from the speaker 12. At step r6, which is a process conducted in course of message reproduction, it is judged whether the skip button 16 has been pressed in the case of direct manipulation of the telephone set 51, or whether the skip operation command 2# is detected in the case of manipulation through the telephone circuit network 13. If the skip operation button 16 has not been pressed, or when the skip operation command 2# is not detected, the operation goes to step r7.

Similarly, at step r7, which is a process conducted in course of message reproduction, it is judged whether the return button 15 has been pressed in the case of direct manipulation of the telephone set 51, or whether the return command 21# is detected in the case of manipulation through telephone circuit network 13. If the return button 15 has not been pressed, or when the return command 21# is not detected, the operation goes to step r8. At step r8, it is judged whether supply of voice data is over or not. When the voice data have been supplied to the reproduction apparatus 4 till the end, the operation goes to step r9. At step r9, terminating the reproduction, the process is finished.

At step r1, if manipulating through the telephone circuit network 13, the operation skips to step r10. At step r10, when the reproduction command 1# is inputted through telephone circuit 13 and is detected by the DTMF signal detector 7, at subsequent step r11, the connection route between the reproduction apparatus 4 and telephone circuit network 13 is validated so that the voice signal from the reproduction apparatus 4 may be sent out to the telephone circuit network 13. Thereafter, the process following step r4 is executed.

At step r6, if the skip operation button 16 has been pressed or the skip operation command 2# has been inputted, the operation advances to step r12. At step r12, reproduction of message is stopped. At subsequent step r13, referring to the data in the storage device C, it is judged whether there is a start position of voiced section after a reproduction stopping position. When a start position of voiced section is not present after a reproduction stopping position, reproduction is over by advancing to step r9. If a start position of voiced section is present, the operation advances to step r14. At step r14, read position of voice data is moved to the start position of the next voiced section. After step r14, returning to step r5, the voice data are supplied into the reproduction apparatus 4 from the moved read position of voice data.

At step r7, when the return button 15 has been pressed or the return command 21# has been inputted, the operation skips to step r15. At step r15, reproduction of the message is stopped. At subsequent step r16, referring to the data in the storage device C, it is judged whether there is a start position of voiced section after the reproduction stopping position. If there is no start position of voiced section, the reproduction is terminated by going to step r9. If there is a start position of voiced section, the operation advances to step r17. At step r17, the read position of voice data is moved to the immediately preceding start position of voiced section. After step r17, returning to step r5, the voice data are supplied into the reproduction apparatus 4 from the moved start position of voice data.

Figure 8:
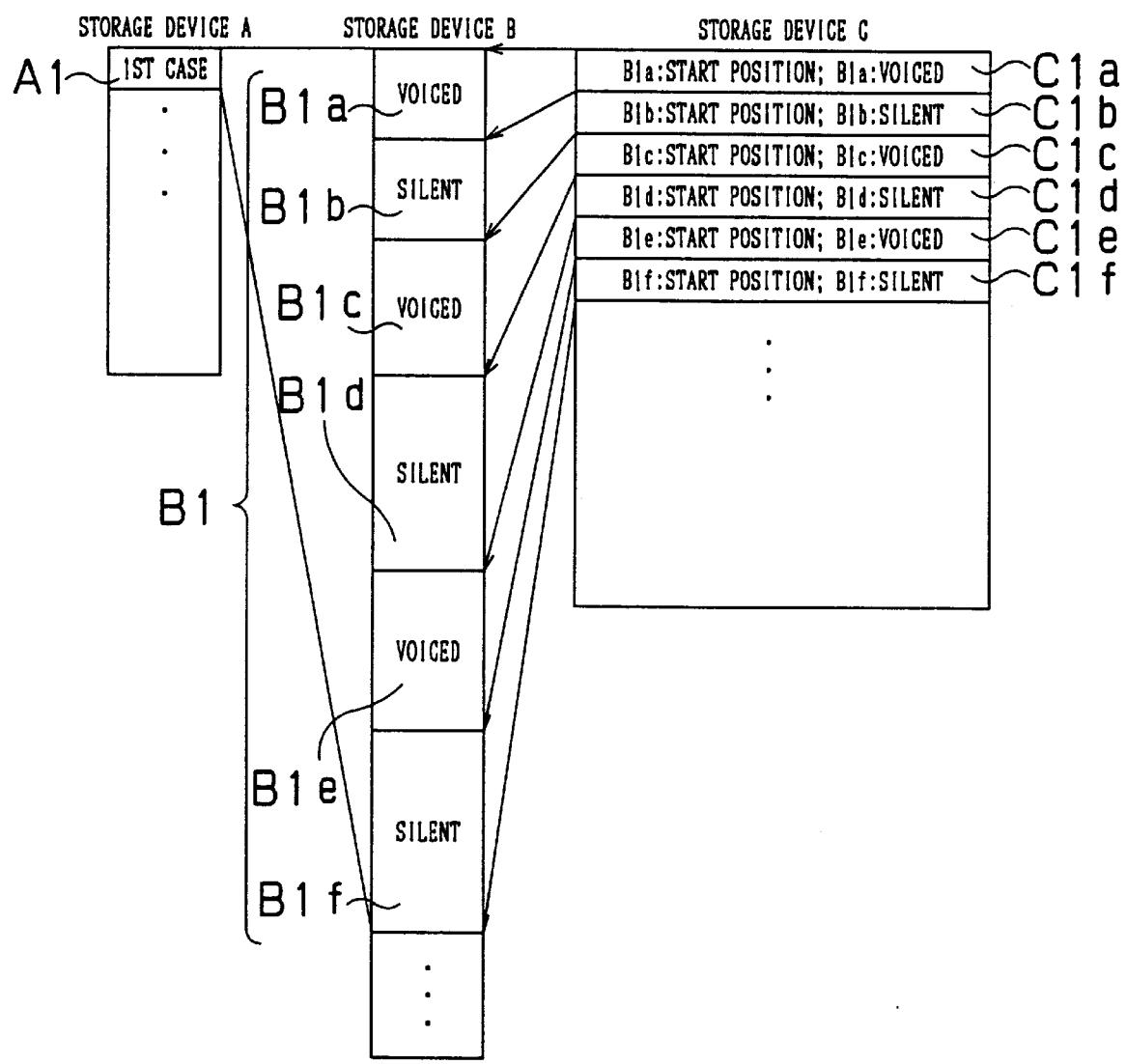
FIG. 8 is a diagram showing recorded voice data being stored in the memory devices A, B and C in the telephone set 51.

FIG. 8 is a diagram showing the constitution of each storage device. A region B1 in the storage device B is a region for storing a first message, the size of the region B1 is large enough only to store the voice data in a predetermined recording possible time. The region B1 is divided into region portions, depending on whether it is a voiced section or a silent section. The voiced section and silent section exist alternately, and the size of each region portion is not limited in the region B1. In this embodiment, the region B1 is divided into region portions B1a to B1f. The region portions B1a, B1c and B1e are voiced sections, and the region portions B1b, B1d and B1f are silent sections. Regions C11 to C16 in the storage device C correspond respectively to the region portions B1a to B1f, in which the recording start position of corresponding region portions, and voiced and silent information showing whether the voice data stored in the region portions are voiced data or silent data are stored.

FIGS. 9A to 9C are timing charts when reproducing messages in the telephone set 51. In the message example shown in FIG. 9A, in a period T1 from time t0 to time t1, "Hello, this is X speaking" is delivered to the speaker 12 or a telephone circuit network 13 as the output on the basis of the voice data stored in the region portion B1a. The subsequent period T2 from time t1 to time t2 is a silent section, and it is indicated as ". . . " in FIGS. 9A to 9C. In a period T3 from time t2 to time t3, "Thanks for yesterday" is delivered as the output on the basis of the voice data stored in the region portion B1c. Period T4 from time t3 to time t4 is a silent section. In a period T5 from time t4 to time t5, "I'll call you tomorrow" is delivered as the output on the basis of the voice data stored in the region portion B1e. A period T6 from time t5 to time t6 is a silent section.

During reproduction of message in such constitution, for example, at a time t11, when the skip operation button 16 is pressed, the content of a period T11 is not reproduced but is skipped, and reproduction is resumed from the beginning of the period T3. Therefore, as shown in FIG. 9B, from the time t11 when the skip operation button 16 is pressed, "Thanks for yesterday" is delivered. After the period T3, reproduction is done same as in the example shown in FIG. 9A. When a return button 15 is pressed at a time t11, the same output as in the example in FIG. 9A is made from time t11 as shown in FIG. 9C.

Figure 10:
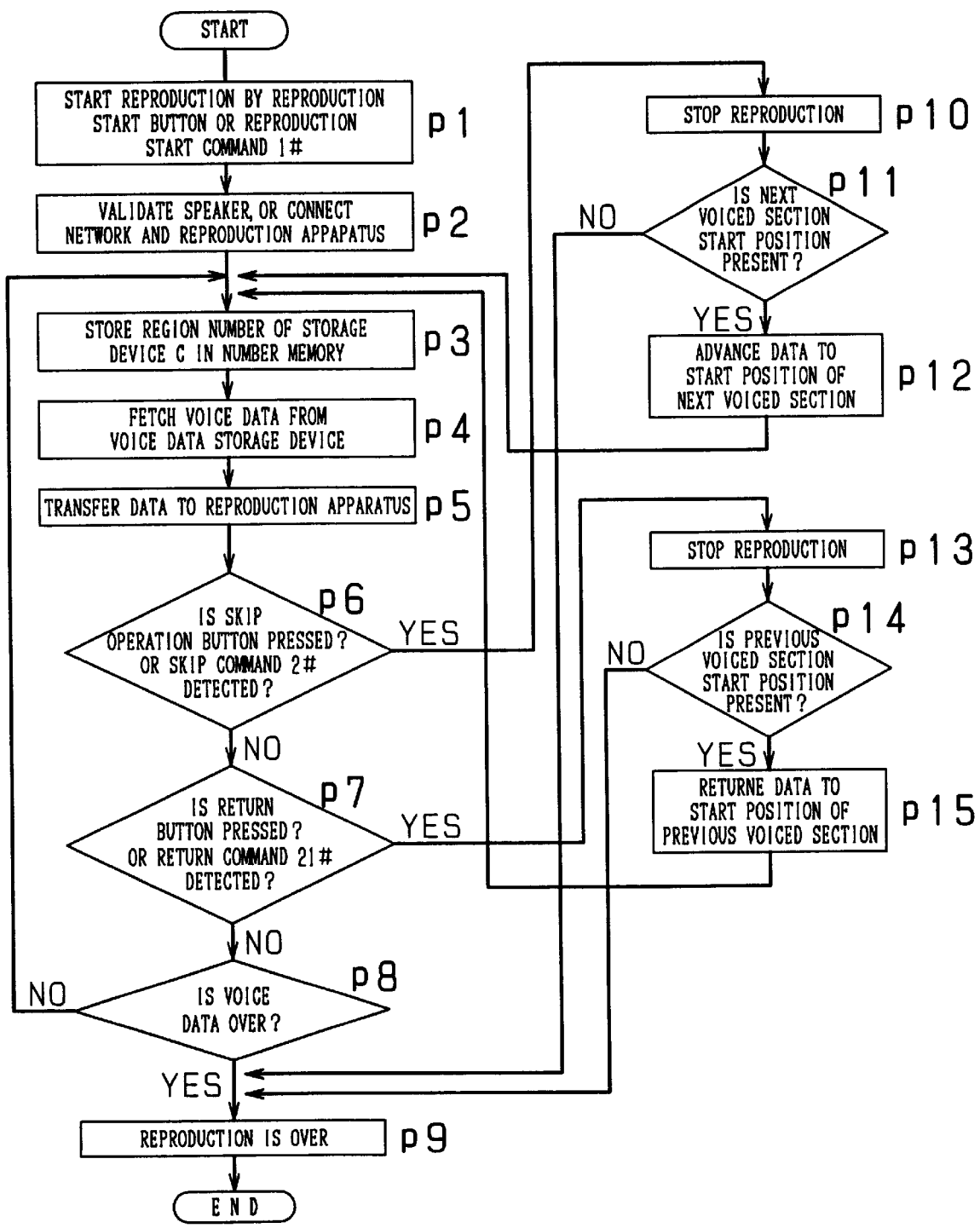
FIG. 10 is a flowchart showing processing in reproduction in the telephone set 51.

FIG. 10 is a flow chart showing processing when reproducing in the telephone set 51. At step p1, reproduction is started when the reproduction start button 14 is pressed, or when the DTMF signal inputted through the telephone circuit network 13 is the reproduction start command 1#. At subsequent step p2, when the reproduction start button 14 has been pressed, the connection route between the reproduction apparatus 4 and the speaker 12 is validated so that the message from the speaker 12 may be delivered as acoustic output. When the reproduction start command 1# has been inputted, the connection route between the reproduction apparatus 4 and network controller 2 is validated so that the voice signal can be sent out to the network 13.

At step p3, the region number of the storage device C is stored in the region number memory (hereinafter number memory) in the storage device 9. When reproduction of voice data corresponding to the region number stored in the number memory 38 is over, the next region number of this region number is stored in the number memory 38. Therefore, the region number corresponding to the region number being reproduced is always stored in the number memory 38. At step p4, the voice data are read out from the storage device B of the acoustic data storage device 5, and at subsequent step p5, the voice data are inputted into the reproduction apparatus 4. As the voice data are supplied into the reproduction apparatus 4, the message is reproduced from the speaker 12.

At step p6, which is a process conducted in course of message reproduction, it is judged whether the skip button 16 has been pressed in the case of direct manipulation of the telephone set 51, or whether the skip operation command 2# is inputted in the case of manipulation through the telephone circuit network 13. If the skip operation button 16 has not been pressed, or when the skip operation command 2# is not inputted, the operation goes to step p7. Similarly at step p7, which is a process conducted in course of message reproduction, it is judged whether the return button 15 has been pressed in the case of direct manipulation of the telephone set 51, or whether the return command 21# is inputted in the case of manipulation through the telephone circuit network 13. If the return button 15 has not been pressed, or when the return command 21# is not inputted, the operation goes to step p8. At step p8, it is judged whether supply of voice data is over or not. When the voice data have been supplied to the reproduction apparatus 4 till the end, the operation goes to step p9. At step p9, terminating the reproduction, the process is finished.

At step p6, when the skip operation button 16 has been pressed or the skip operation command 2# has been inputted, the operation goes to step p10. At step p10, reproduction of message is stopped. At subsequent step p11, reading out the data stored in a region C1x ($1 \leq x \leq 6$) corresponding to the region number stored in the number memory 38, it is judged whether a start position of voiced section is present or not, by the data stored in a region C1x+1 corresponding to the immediately succeeding region number if the data stored in a region C1x are silent, or the data stored in a region C1x+2 of the second succeeding region number if the data stored in the region C1x are voiced. When a start position of voiced section is not present, going to step p9, the reproduction is over. When a start position of voiced section is present, the operation goes to step p12. At step p12, the data start position of the region portion which is a voiced section of the storage device B stored in the storage device C is the reproduction start position. Thereafter, the processing following step p3 is done.

At step p7, when the return button 15 has been pressed or the return command 21# has been inputted, the operation goes to step p13. At step p13, reproduction of message is stopped. At subsequent step p14, referring to the data stored in the storage device C, it is judged whether there is a start position of voiced section before the reproduction stopping position or not. If a start position of voiced section is not present, going to step p9, the reproduction is over. If a start position of voiced section is present, the operation goes to step p15. At step p15, the start position of the voiced section is the reproduction start position. Thereafter, the processing following step p3 is done.

Thus, according to this embodiment, by pressing the skip operation button 16 or entering the skip operation command 2# in course of reproduction of the message recorded in the storage device B of the voice data storage device 5, skipping undesired voiced section and silent section, reproduction is resumed from the start position of the next voiced section, and hence the reproduction time is shortened and the controllability is enhanced. As the reproduction time is shortened and the controllability is enhanced, the time required for hearing the message is shortened in the case of manipulation through the telephone circuit network 13, and hence the duration of a call is shorter and the telephone charge necessary for access is saved. Meanwhile, the voiced section and silent section are skipped only in the case of skip operation, and only the undesired section be skipped.

Figure 11A:
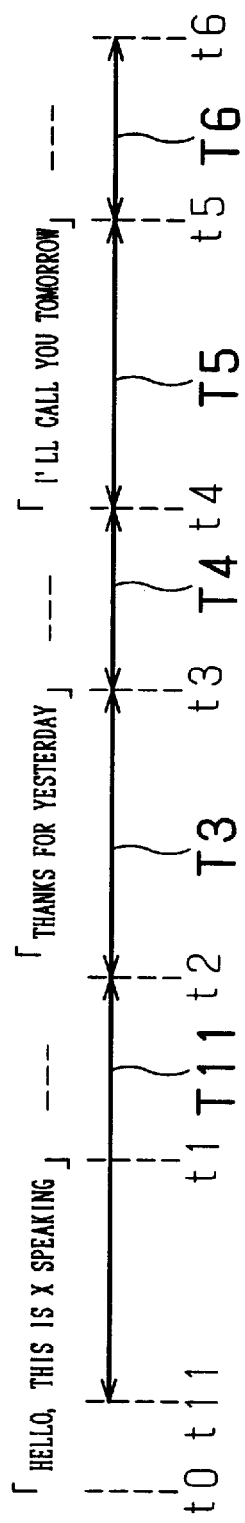
FIGS. 11A and 11B are timing charts when reproducing a message in a telephone set 52 of a second embodiment of the invention.
Figure 11B:
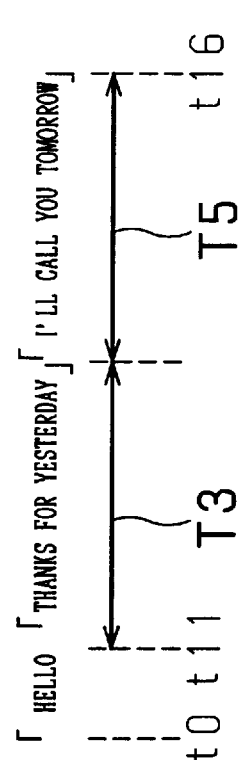

FIGS. 11A and 11B are timing charts when reproducing a message in a telephone set 52 of a second embodiment of the invention. It is a feature of the telephone set 52 of this embodiment that silent sections existing after a first skip operation during reproduction of message are automatically skipped without repeated skip operation. The telephone set 52 is identical in constitution with the telephone set 51, and its explanation is omitted.

An example of reproduction shown in FIG. 11A is same as in FIG. 9A, and its explanation is omitted. At the time t11 in the example of reproduction in FIG. 11A, when skip operation is effected, the message in the period T11 from time t11 to time t2 is skipped and is not reproduced. In the subsequent silent sections of a period T4 and the period T6, no reproduction is made.

Therefore, by skip operation at time t11, reproduction is done as shown in FIG. 11B. In the reproduction example in FIG. 11B, "Hello" is reproduced from time t0 to time t11, and successively from time t11, the data in the period T3 "Thanks for yesterday" are reproduced, and in the subsequent period T3, the data in the period T5 "I'll call you tomorrow" are reproduced in succession.

Figure 12:
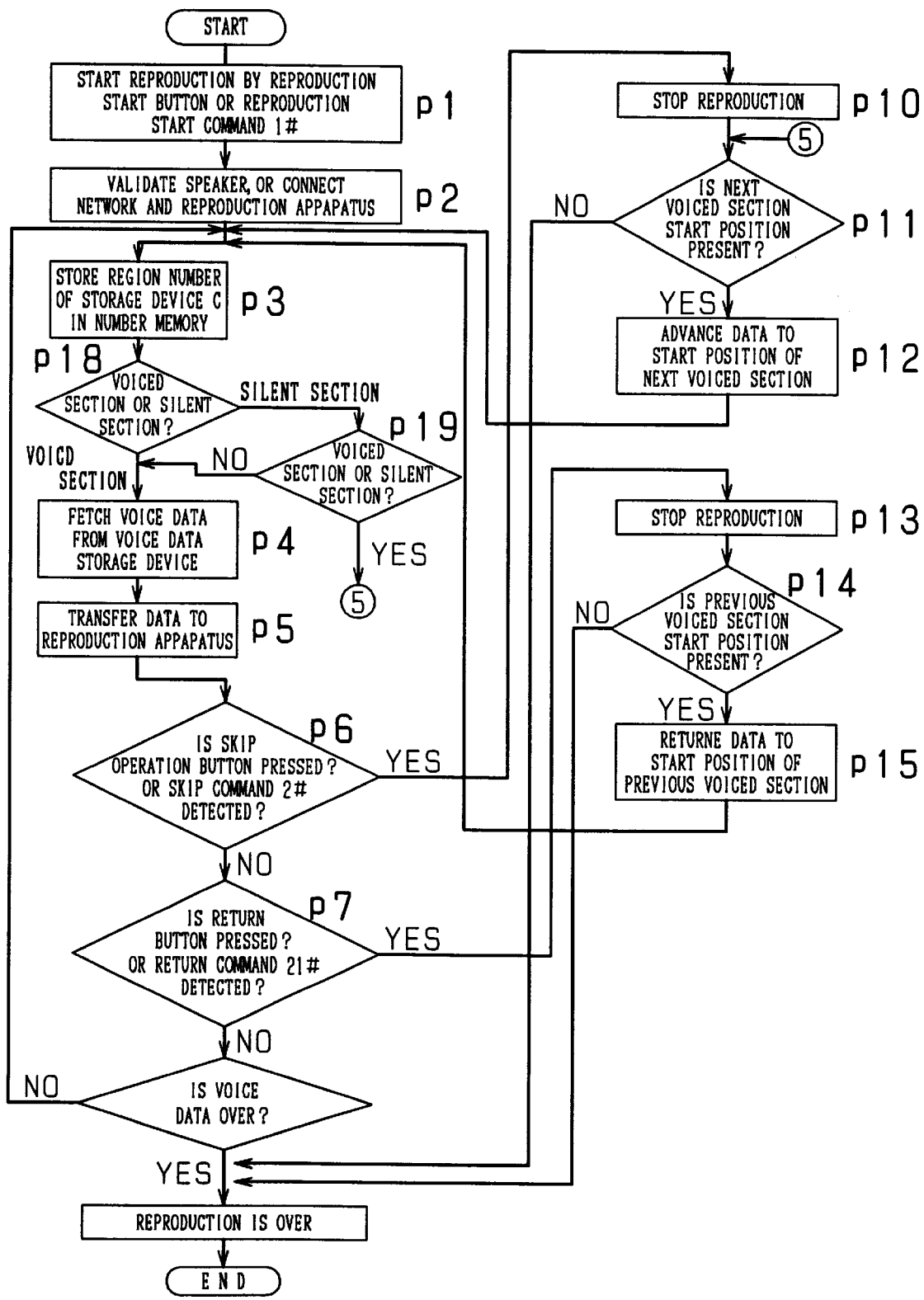
FIG. 12 is a flowchart showing processing in reproduction in the telephone set 52.

FIG. 12 is a flowchart showing processing in reproduction in the telephone set 52. In this flowchart, the same processes as in the flowchart shown in FIG. 10 are provided with same step numbers, and explanations are omitted. In this flowchart, between step p3 and step p4 in the flowchart shown in FIG. 10, step p18 and step p19 are inserted.

After storing the region number in the number memory 38 at step p3, at step p18, the voice data stored in the region corresponding to the region number are judged to be voiced or silent data. In the case of a voiced section, the process after step p4 is effected. In the case of a silent section, the operation advances to step p19. At step p19, it is judged whether skip operation has been done during reproduction of message or not. If the skip operation is not done, the process following step p4 is effected. If the skip processing has been done, the process following step p11 is done.

Thus, according to the embodiment, by performing skip operation during reproduction of the message recorded in the storage device B, undesired voiced section and silent section can be skipped, and reproduction is resumed from the start position of the next voiced section, and therefore the reproduction time is shortened, and the controllability is enhanced. Moreover, the subsequent silent sections after skip operation are automatically skipped without repeating the skip operation, and the labor of operation is saved. Still more, as the reproduction time is shortened and the controllability is enhanced, the time required for hearing the message is shortened in the case of manipulation through the telephone circuit network 13, and hence the duration of a call is shorter and the telephone charge necessary for access is saved.

FIG. 13 is a timing chart when reproducing the message in a telephone set 52a of a third embodiment of the invention. The telephone set 52a in this embodiment is same in constitution as the telephone set 52 of the second embodiment, and its explanation is omitted. It is a feature of the telephone set 52a of this embodiment that the silent sections existing after first skip operation are automatically skipped without having to repeat the skip operation, but that, after a second skip operation, the silent regions existing after this operation point are reproduced.

An example of message shown in FIG. 13A is same as in the example in FIG. 9A, except that there is a silent section in a period T50 from time t50 to time t51, and the explanation of storing method and others is omitted. Each period from time t51 to time t57 corresponds respectively to each period from time t0 to time t6 in FIG. 9. That is, in a period T51, "Hello, this is X speaking" is reproduced. In a period T53, "Thanks for yesterday" is reproduced. In a period T55, "I'll call you tomorrow" is reproduced. Period T52, T54 and T56 are silent sections.

During reproduction of the period T51, when the user of the telephone set 52a makes a skip operation such as input of the skip operation command 4#, for example, as shown in FIG. 5, the reproduction of the period T51 is immediately followed by reproduction of "Thanks for yesterday" in the period T53, and reproduction of "I'll call you tomorrow" in the period T55, thereby finishing reproduction of the message. Therefore, silent sections in periods T52, T54 and T56 existing after the period T51 are not reproduced.

During reproduction in the period T53 in FIG. 13B, when the user makes a second skip operation, the silent sections existing after the period T53 are reproduced as shown in FIG. 13C. That is, after the reproduction of the period T53, the silent section in the period T54 is reproduced, and after reproduction of the T55, the silent section in the period T56 is reproduced.

Therefore, according to the embodiment, in course of reproduction, if the user considers reproduction of silent sections is unnecessary and conducts the skip operation, silent sections existing after this point are skipped, and only voiced sections are reproduced. Hence reproduction time is shortened, and the silent sections are skipped without repeating operation, so that the controllability is enhanced. Besides, by conducting the skip operation again after the first skip operation, the silent sections existing after the second operation are reproduced, and therefore if it is hard to hear due to consecutive voiced sections after the operation to reproduce by skipping silent sections, by conducting the skip operation again, the silent sections can be reproduced as the message is recorded, and the message may be heard in favorable state.

In this embodiment, when skipping a silent section by skip operation, reproduction of a certain voiced section is immediately followed by reproduction of the next voiced section, but as shown in FIG. 13D, at the location of silent section, a beep sound may be generated. In FIG. 13D, periods T57, T58 and T59 are beep generating sections. Since the beep sound is generated instead of the silent section instructed by the user to skip, the reproduction time of message can be shortened, and it is easily known whether the silent section is skipped or not during reproduction of message. By hearing the beep sound, moreover, the user sees that the skip operation is effective, and the user knows second skip operation is necessary to return to normal reproduction state.

Also in this embodiment, for example, for skip operation done during reproduction of a voiced section, a silent section is skipped after completion of reproduction of that voiced section, but as shown in the first and second embodiments, the reproduction may be skipped from the skip operation point till the start position of the next voiced section.

FIG. 14 is a timing chart of reproduction of a message in a telephone set 53 of a fourth embodiment of the invention. The telephone set 53 is same in constitution as the telephone set 51, and its explanation is omitted.

It is a feature of the telephone set 53 of the embodiment that the reproduction is performed by raising the reproduction speed, whether the section being reproduced is voiced section or silent section, when the skip operation button 16 is pressed or the skip operation command 2# is inputted during reproduction of a message, and is returned to normal speed from the start position of the next voiced section. When the return button 15 is pressed or the return command 21# is inputted, reproduction is performed in reverse direction by raising the reproduction speed, and when reproduced back to the start position of the voiced section, reproduction is done in normal direction at normal speed.

An example of reproduction of message shown in FIG. 14A is same as in FIG. 9A, and its explanation is omitted. When the skip operation button 16 is pressed at time t11, in the period T11 until time t2 corresponding to the start position of the next voiced section, reproduction is done by raising the reproduction speed by means of, for example, a reproducing device capable of reading out the voice data faster than the normal speed and converting into voice signal. After time t2, the reproduction is done at normal speed.

FIG. 14B and FIG. 14C are examples of reproduction by pressing the return button 15. In the reproduction example in FIG. 14B, when the return button 15 is pressed at time t11, the reproduction is done in reverse direction at raised reproduction speed in a period T16 from time t11 to time t17. When reproduced back to the beginning of the voiced section in which the return button 15 is pressed, the reproducing direction is returned to the normal direction at time t17 to reproduce at normal speed.

In the reproduction example in FIG. 14C, since the return button 15 has been pressed at time t2 in silent section, reproduction is done in reverse reproduction direction by raising the reproduction speed in a period T18 from time t2 to time t18. That is, in period T18, the message reproduced in a period T17 from time t0 to time t2 is reproduced in reverse direction at raised reproduction speed. At time t18, when reproduced back to the beginning of the voiced section, the reproducing direction is returned to the normal direction to reproduce by returning to normal reproduction speed. Incidentally, in FIGS. 14B and 14C, the periods of reverse reproduction when the voice message can not be recognized are denoted by "A" or "AAA".

Figure 15:
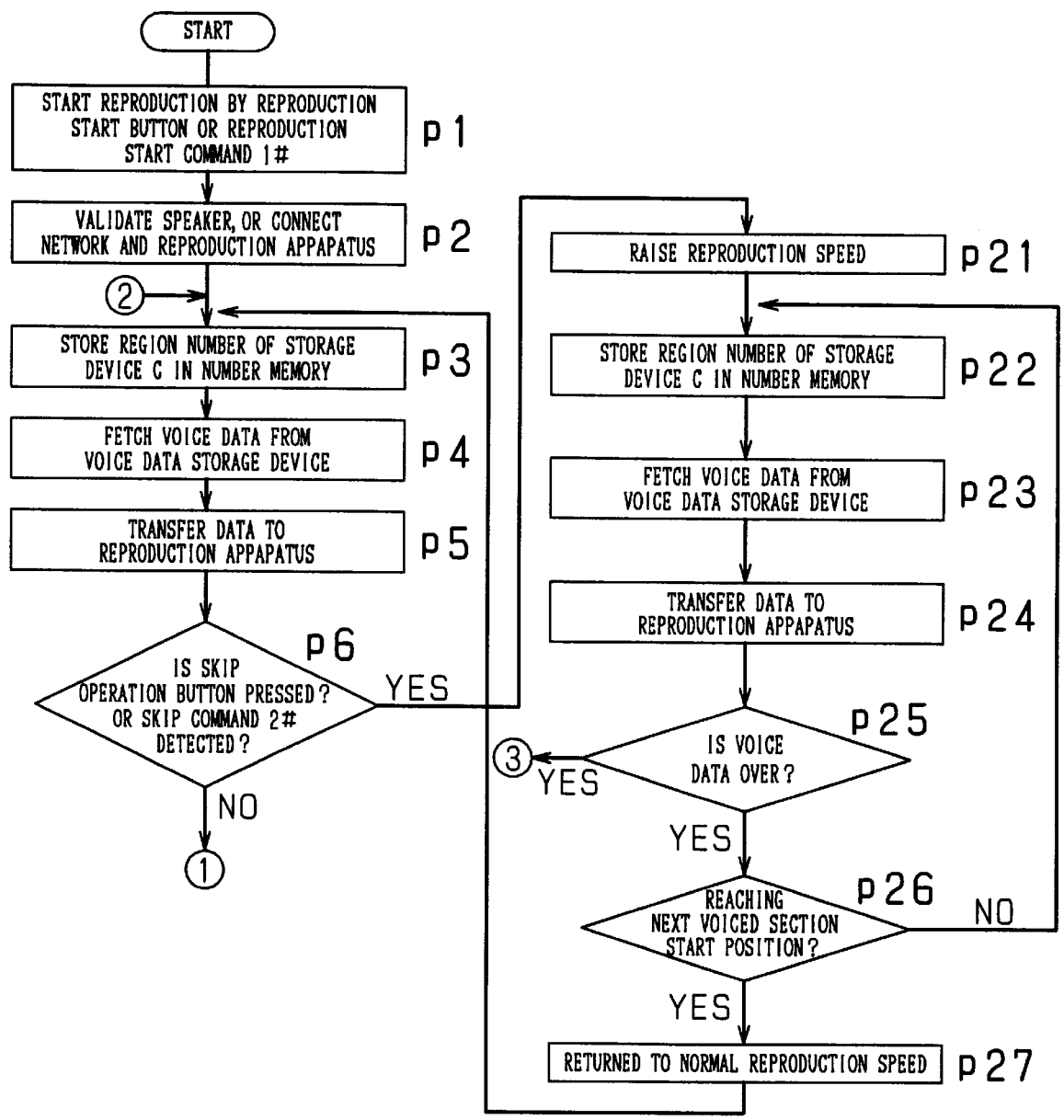
FIG. 15 is a flowchart showing processing in reproduction in the telephone set 53.
Figure 16:
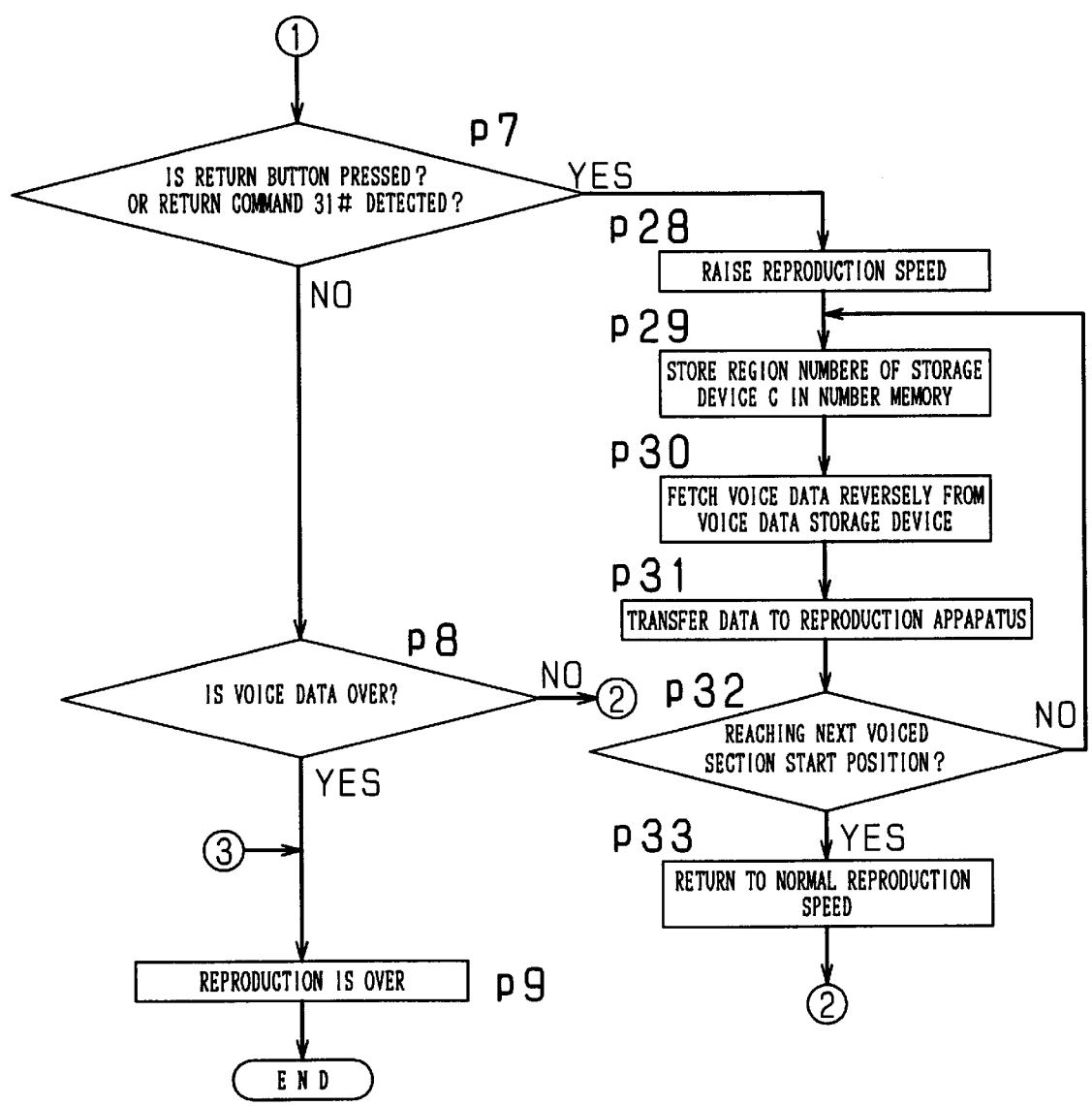
FIG. 16 is a flowchart showing processing in reproduction in the telephone set 53.

FIG. 15 and FIG. 16 are flowcharts showing processing in reproduction in the telephone set 53. In the flowcharts, the same processes as in the flowchart in FIG. 10 are identified with same step numbers, and their explanations are omitted. In this flowchart, processing at steps p10 to p12 in the flowchart in FIG. 10 is replaced by processing at steps p21 to p27, and processing at steps p13 to p15 is replaced by processing at steps p28 to p33.

At step p6, if skip operation is effected by pressing the skip operation button 16 or entering the skip operation command 2#, the operation advances to step p21. At step p21, on the basis of the code corresponding to the control signal showing the skip operation button 16 has been pressed or the skip operation command 2# converted by the DTMF signal detector 7, the controller 1 quickens the reproduction speed of the message in the reproduction apparatus 4 than in the normal reproduction. At subsequent step p22, the region number provided in each region in the storage device C of the voice data memory means 5 is stored in the number memory 38 of the storage device 9. At step p23, the voice data stored in the region corresponding to the region number stored in the number memory 38 are read out from the storage device B, and the corresponding voice data are inputted in the reproduction apparatus 4 at step p24. As the voice data are inputted into the reproduction apparatus 4, the message is reproduced from the speaker 12.

At step p25, in the quickened reproduction speed state, it is judged whether the voice data stored in the storage device B are finished or not. When the voice data have been finished, the process after step p9 is done. When the voice data are not finished, the operation advances to step p26. At step p26, reproduction is started by quickening the reproduction speed, and then it is judged whether having reached the start position of the next voiced section. When reaching the start position of the next voiced section, the operation advances to step p27. At step p27, the reproduction speed is return to normal reproduction speed. After returning to reproduction speed, the process following step p3 is done. At step p26, if having not reached the start position of the next voiced section, the process after step p22 is repeated.

At step p7, if the return button 15 has been pressed or the return command 31# has been inputted, the operation advances to step p28. At step p28, on the basis of the code corresponding to the control signal showing the return button 15 has been pressed or the return command 31# converted by the DTMF signal detector 7, the controller 1 quickens the reproduction speed of the message in the reproduction apparatus 4 than in the normal reproduction. At subsequent step p29, the region number provided in each region in the storage device C is stored in the number memory 38. At step p30, the voice data stored in the region corresponding to the region number stored in the number memory 38 are read out reversely from the storage device B, and the corresponding voice data are inputted in the reproduction apparatus 4 at step p31. As the voice data are inputted into the reproduction apparatus 4, the message is reproduced from the speaker 12.

At step p32, after starting reverse reproduction by raising the reproduction speed, it is judged whether having reached the start position of voiced section or not. When reaching the start position of voiced section, at subsequent step p33, the reproduction speed is returned to normal reproduction speed, and after returning to normal reproduction speed, the process after step p3 is effected. At step p32, if having not reached the start position of voiced section, the process after step p29 is repeated.

Thus, according to the embodiment, when the skip operation button 16 is pressed or the skip operation command 2# is inputted during reproduction of message, the message is heard at high reproduction speed until the start position of the next voiced section, and hence the reproduction time can be shortened. From the start of the next voiced section, reproduction is done at normal speed, and the necessary message can be heard securely. It is only when the skip operation is done that the reproduction is done by raising the reproduction speed, and hence only a desired section can be heard by raising the reproduction speed.

Also according to the embodiment, when the return button 15 is pressed or the return command 31# is inputted during reproduction of message, the message is reproduced reversely at raised reproduction speed back to the start position of an immediately preceding voiced section, and from the start position of this voiced section, reproduction is done in normal direction at normal reproduction speed, so that the voice message can be confirmed, and a desired message portion can be searched easily.

Figure 17:
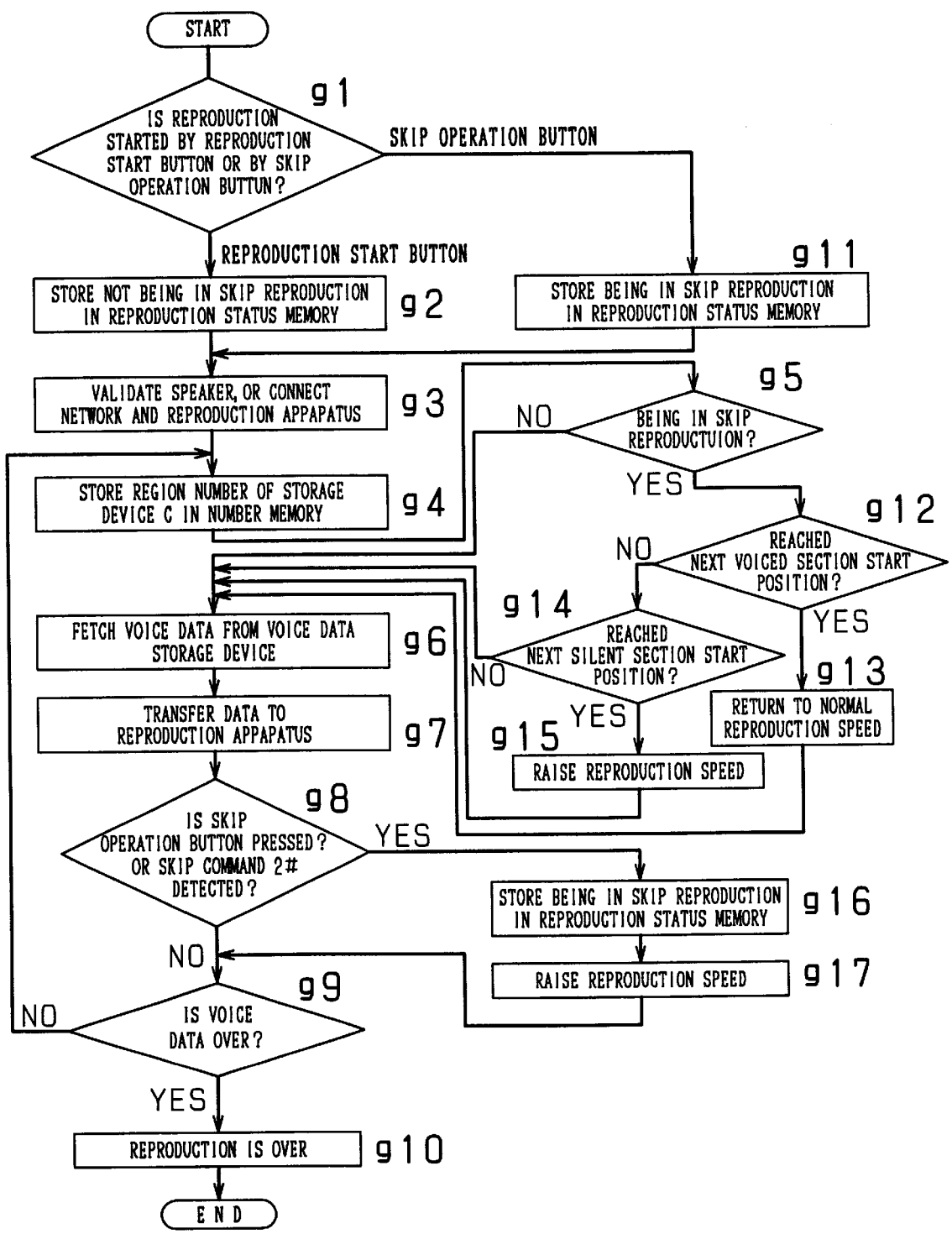
FIG. 17 is a flowchart showing processing in reproduction in a telephone set 54 of a fifth embodiment of the invention.

FIG. 17 is a flowchart showing processing in reproduction in a telephone set 54 of a fifth embodiment of the invention, especially in skip operation. The telephone set 54 is same in constitution as telephone set 51, and its explanation is omitted.

It is a feature of the telephone set 54 of the embodiment that reproduction is done by raising the reproduction speed, whether the section being reproduced is a voiced section or silent section, when the skip operation button 16 is pressed or the skip operation command 2# is inputted during reproduction of a message, and is done at normal speed from the start position of the next voiced section, and thereafter is done by raising the reproduction speed automatically at every silent section. Moreover, by starting reproduction by pressing the skip operation button 16 or entering the skip operation command 2#, the silent section can be reproduced by raising the reproduction speed without requiring skip operation during reproduction of message.

In the flowchart shown in FIG. 17, first at step g1, it is judged whether reproduction is started by pressing the reproduction start button 14 or entering the reproduction start command 1#, or reproduction is started by pressing the skip operation button 16 or entering the skip operation command 2#. In the case of reproduction start by reproduction start operation, the operation advances to step g2. At step g2, to reproduce normally instead of skip reproduction, the normal reproduction mode is stored in a reproduction status memory 39 contained in the storage device 9.

At subsequent step g3, in the case of reproduction start by directly manipulating the telephone set 54, the connection route of the speaker 12 and reproduction apparatus 4 is validated, so that an acoustic output may be delivered from the speaker 12. In the case of reproduction start by remote operation through the telephone circuit network 13, the connection route of the reproduction apparatus 5 and network controller 2 is validated, so that the voice signal may be connected to the telephone circuit network 13. At step g4, the region number provided in each region in the storage device C is stored in the number memory 38.

At step g5, reading out the data in the reproduction status memory 39, it is judged whether skip reproduction has been instructed or not. If skip reproduction has not been instructed, the operation goes to step g6. At step g6, the voice data are read out from the storage device B. At subsequent step g7, as the voice data are inputted into the reproduction apparatus 4, reproduction of the message is started. At step g8 processed during reproduction of message, it is judged whether the skip operation button 16 has been pressed in the case of direct manipulation of the telephone set 54, or if the skip operation command 2# is inputted in the case of manipulation through the telephone circuit network 13. If the skip operation button 16 has not been pressed or the skip operation command 2# has not been inputted, the operation goes to step g9. At step g9, it is judged whether supply of voice data is over or not. When supplied to the end of the voice data to the reproduction apparatus 4, the operation goes to step g10. At step g10, terminating the reproduction, the processing is over.

At step g1, if reproduction is started by skip operation, the operation advances to step g11. At step g11, the skip reproduction mode is stored in the reproduction status memory 39. Thereafter, processing after step g3 is effected.

If the skip reproduction is in process at step g5, the operation advances to step g12. At step g12, it is judged whether having reached the start position of the next voiced section according to the voiced or silent section information of the storage device C. When reaching the start position of the next voiced section, the operation goes to step g13. At step g13, to reproduce the voice data which are voiced at normal speed, the controller 1 instructs the reproduction apparatus 4 to reproduce at normal reproduction speed. Thereafter, the processing following step g6 is effected. At step g12, meanwhile, if having not reached the start position of the next voiced section, the operation goes to step g14. At step g14, it is judged whether having reached the start position of the next silent section according to the voiced and silent section information of the storage device C. When reaching the start position of the next silent section, the operation goes to step g15. At step g15, to reproduce the voice data which are silent at raised reproduction speed, the controller 1 instructs the reproduction apparatus 4 to reproduced at raised reproduction speed. Thereafter, the processing following step g6 is effected. At step g14, meanwhile, if having not reached the start position of the next silent section, the processing after step g6 is carried out.

At step g8 processed during reproduction of message, when the skip operation button 16 is pressed or the skip operation command 2# is inputted, the operation advances to step g16. At step g16, the skip reproduction mode is stored in the reproduction status memory 39. At subsequent step g17, to reproduce by skipping, the reproduction apparatus 4 is instructed to reproduce at raised reproduction speed. After the reproduction speed is raised, the processing after step g9 is carried out. At step g9, if transfer of the voice data to be reproduced has not been completed yet, the process after step g4 is effected.

Thus, according to the embodiment, by pressing the skip operation button 16 or entering the skip operation command 2# once, the skip reproduction mode is stored in the reproduction status memory 39, and the silent sections existing after the skip operation are reproduced by raising the speed without having to manipulate again, and therefore skip operation is to needed when skipping silent sections, and labor of operation can be saved.

In the flowchart shown in FIG. 17 of the embodiment, by skipping the processing of step g17, the subsequent silent sections are reproduced by raising the reproduction speed.

Figure 18:
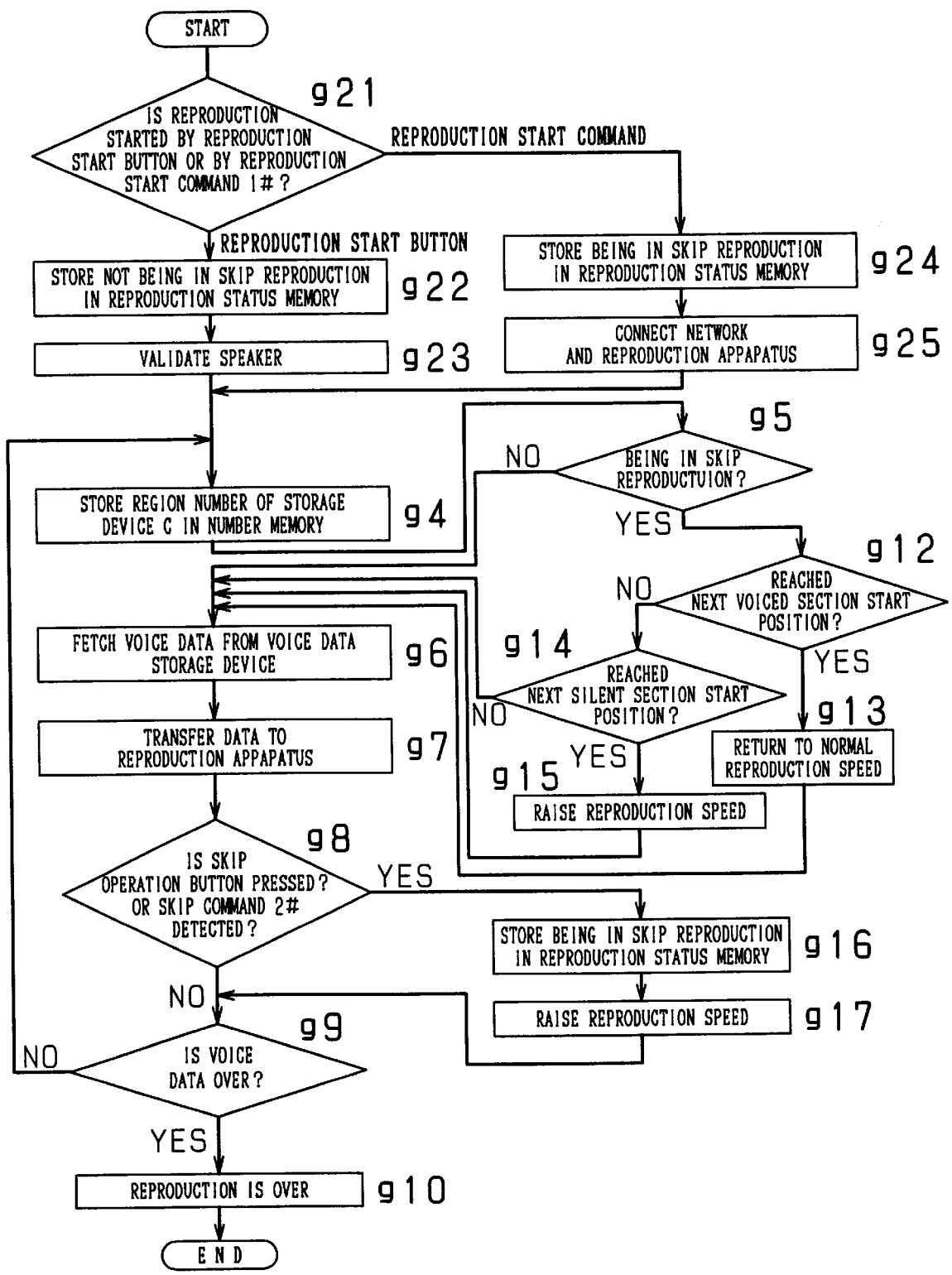
FIG. 18 is a flowchart showing processing in reproduction of a telephone set 55 in a sixth embodiment of the invention.

FIG. 18 is a flowchart showing processing when reproducing in a telephone set 55 of a sixth embodiment of the invention. The telephone set 55 is same in constitution as the telephone set 51, and its explanation is omitted. It is a feature of the telephone set 55 of the embodiment that reproduction is done at normal reproduction speed when reproduction is started by pressing the reproduction start button 14, and is done at raised reproduction speed, if not instructed, when reproduction is started by input of the reproduction start command 1#.

In the flowchart in FIG. 18, the same processes as in the flowchart in FIG. 17 in the fifth embodiment are identified with same step numbers, and the explanation is omitted. In this flowchart, steps g1 to g3 and step g11 in the flowchart in FIG. 17 are replaced by the processing at steps g21 to g25.

In the flowchart shown in FIG. 18, first at step g21, it is judged whether the reproduction start is instructed by reproduction start button 14 or the reproduction start command 1#. When reproduction is started by pressing of reproduction start button 14, the operation goes to step g22. At step g22, it is stored in the reproduction status memory 39 that it is not skip reproduction. At subsequent step g23, as the reproduction is started by pressing the reproduction start button 14, in order that the message may be reproduced from the speaker 12, the connection route of the reproduction apparatus 4 and speaker 12 is validated. Thereafter, the processing after step g4 is effected.

At step g21, meanwhile, when the reproduction is started by input of the reproduction start command 1#, the operation advances to step g24. At step g24, it is stored in the reproduction status memory 39 that it is skip reproduction. At subsequent step g25, as the reproduction is started by input of the reproduction start command 1#, the connection route of the network controller 2 and reproduction apparatus 4 is validated so that the output from the reproduction apparatus 4 may be sent out to the telephone circuit network 13. Thereafter, the process after step g4 is effected.

Thus, according to the embodiment, the reproduction is normal when reproduction of message is started by pressing of the reproduction start button 14, and the silent section is reproduced by raising the reproduction speed, without skip operation, when the reproduction is started by input of the reproduction start command 1#, and therefore the controllability is enhanced in the manipulation of the telephone circuit network 13 that requires telephone charge for hearing the message, and the labor can be saved. Moreover, the time for skip operation is not needed, so that the duration of a call can be shortened.

In the embodiment, the skip operation is to raise the reproduction speed, but a similar aim is achieved by skipping to the start position of the next voiced section.

Figure 20:
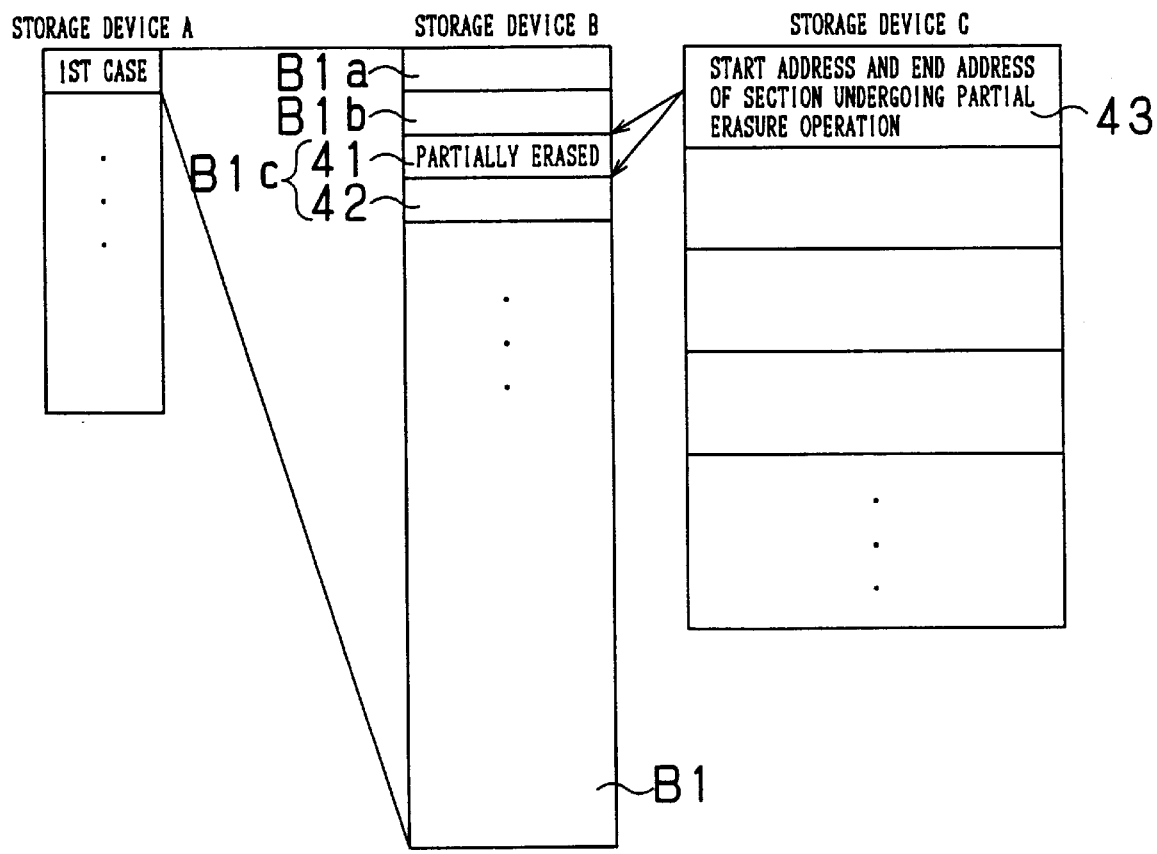
FIG. 20 is a diagram showing the constitution of memory devices A, B and C in the telephone set 56.

FIGS. 19A, 19B are timing charts of partial erasure operation in a telephone set 56 of a seventh embodiment of the invention. FIG. 20 is a diagram showing the constitution of memory devices A, B and C of the telephone set 56. The telephone set 56 is same in constitution as the telephone set 51, and its explanation is omitted.

In the storage device 9, the address of the storage device B for reproducing is stored in the storage device 31, and whether the section being reproduced is a section to be partly erased or not is stored in the storage device 32, and moreover the address stored in the storage device 31 at the time of partial erasure operation is stored in the storage device 33 as partial erasure start address. An erase operation memory 43 contained in the storage device C stores the address stored in the storage device 33 as partial erasure start address, and the address stored in the storage device 31 as partial erasure operation end address, every time erasure operation is done.

It is a feature of the telephone set 56 of the embodiment that the section specified by the partial erasure button 16 or a partial erasure command 7# is not reproduced when reproducing the message next time.

An example of reproduction shown in FIG. 19A is the same in content as the reproduction example shown in FIG. 9A, and its explanation is omitted. In FIG. 19A, partial erasure operation is done in a period T21 from time t2 to time t20. The content "Thanks for" in the period T21 of partial erasure operation is not reproduced at the time of the next operation. FIG. 19B is a timing chart in reproduction after partial erasure operation. In FIG. 19A, "Thanks for" reproduced from time t2 is not reproduced, and "yesterday" is reproduced from time t2.

Referring to FIG. 20, since partial erasure operation is done during reproduction of voice data stored in the region portion B1c, the start address and end address of the erase region which is a region of partial erasure operation are stored in an erase operation memory 43 in the storage device C. The voice data stored in a reproduction region 42 not subjected to partial erasure operation in region portion B1c are reproduced.

Figure 21:
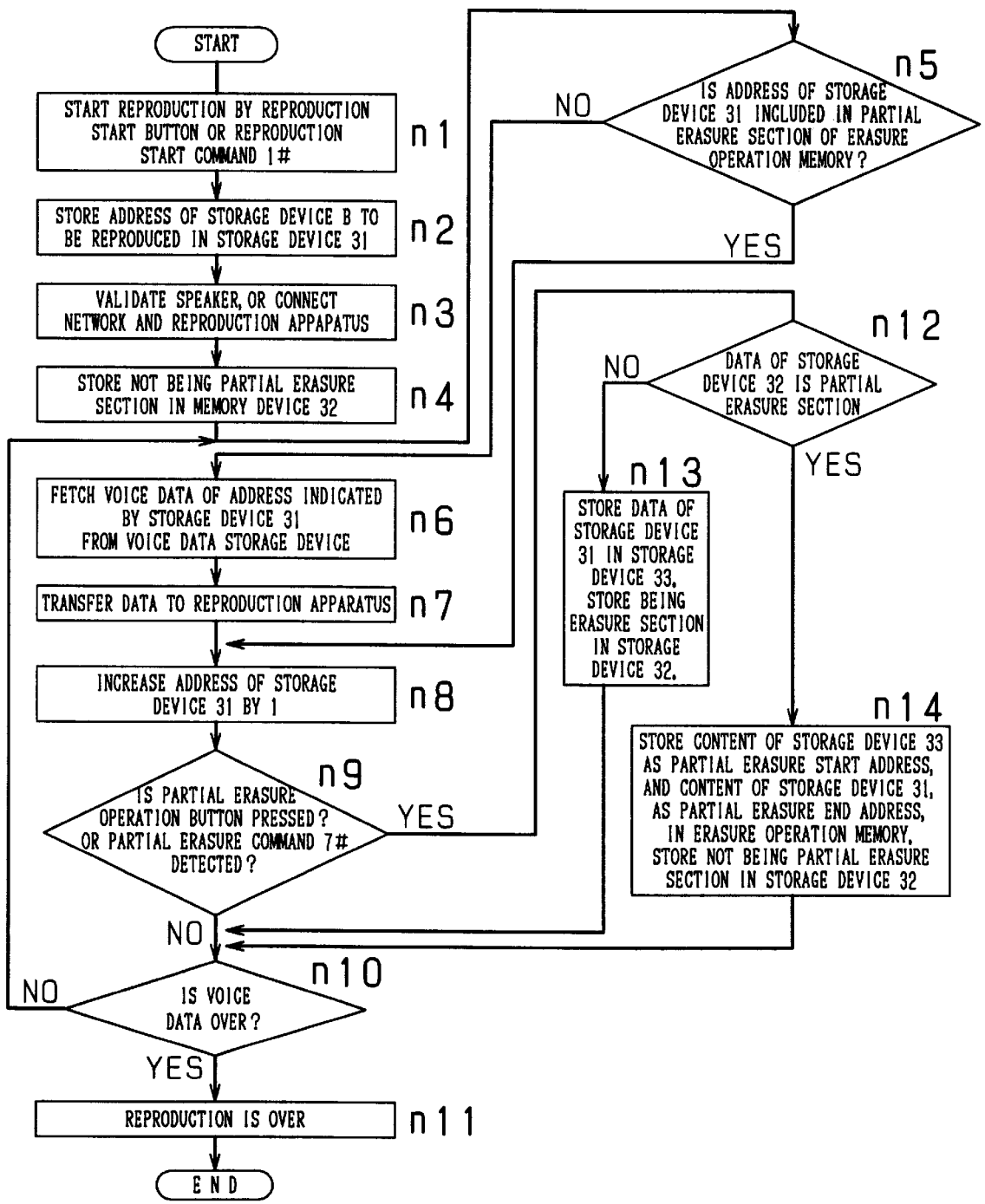
FIG. 21 is a flowchart showing a process of partial erasure operation in the telephone set 56.

FIG. 21 is a flowchart of partial erasure operation in the telephone set 56. First at step n1, reproduction is started when the reproduction start button 14 is pressed, or the DTMF signal inputted through the telephone circuit network 13 is the reproduction start command 1#. At subsequent step n2, the start address of the message in the storage device B stored in the storage device A is stored in the storage device 31 contained in the storage device 9.

At step n3, when reproduction is started by the reproduction start button 14, the connection route of the reproduction apparatus 5 and speaker 12 is validated so that the message may be delivered from the speaker as an acoustic output. When reproduction is started by the reproduction start command 1#, the connection route of the reproduction apparatus 4 and network controller 2 is validated so that the voice signal may be outputted to the telephone circuit network 13.

At step n4, it is stored in the storage device 32 that it is not partial erasure section. At step n5, it is judged whether the start address of the message stored in the storage device 31 is contained in the partial erasure section stored in the erase operation memory 43 or not. If the start address contained the storage device 31 is not contained in the partial erasure section, the operation advances to step n6. At step n6, the voice data are read out from the address stored in the storage device 31, and at subsequent step n7, it is inputted into the reproduction apparatus 4. Since the voice data are inputted into the reproduction apparatus 4, the reproduction of the message is started.

At step n8 which is the process in the midst of reproduction of message, the start address stored in the storage device 31 is set as start address of the next region portion. At subsequent step n9, it is judged whether the partial erasure operation button 18 is pressed during reproduction of the message or the partial erasure command 7# is inputted through telephone circuit network 13. When the partial erasure operation button 18 is not pressed or the partial erasure operation command 7# is not inputted, the operation goes to step n10. At step n10, it is judged whether the voice data to be reproduced are over or not. When the voice data are over, going to step n11, reproduction is terminated at step n11, and the process is over.

At step n5, incidentally, if the start address stored in the storage device 31 is included in the partial erasure section, the process following step n8 is carried out. At step n9, when partial erasure operation is done, the operation goes to step n12. At step n12, it is judged whether partial erasure section is stored in the storage device 32 or not. If stored not as partial erasure section in the storage device 32, the operation goes to step n13. Being stored not as partial erasure section in the storage device 32, it is assumed that first partial erasure operation, that is, start of partial erasure operation has been instructed, and at step n13, the address of the message in the process of reproduction stored in the storage device 31 is stored in the storage device 33, and it is stored as partial erasure section in the storage device 32. Thereafter, the process following step n10 is effected. If stored as partial erasure section in the storage device 32, the operation goes to step n14. Being stored as partial erasure section in the storage device 32, it is assumed that second partial erasure operation, that is, end of partial erasure operation has been instructed, and the address stored in the storage device 33 is stored as partial erasure start address, and the address stored in the storage device 31 is stored as partial erasure operation end address, in an erasure operation memory 43 at step n14. At the same time, it is stored not to be partial erasure section in the storage device 32. Thereafter, the process following step n14 is carried out.

Thus, according to the embodiment, the section partially erased by performing partial erasure operation is not reproduced from the next reproduction, and repeated operation for undesired memory is not needed. The reproduction time of message is also shortened. Furthermore, since the partially erased message is stored in the storage device B, by erasing the content in the erasure operation memory 43, if necessary, all stored message can be reproduced.

In this embodiment, as a method for specifying the partial erasure section, the partial erasure operation is specified twice by the partial erasure button 18, but the duration of pressing the partial erasure button 18, for example, may be specified as the partial erasure section.

Figure 22:
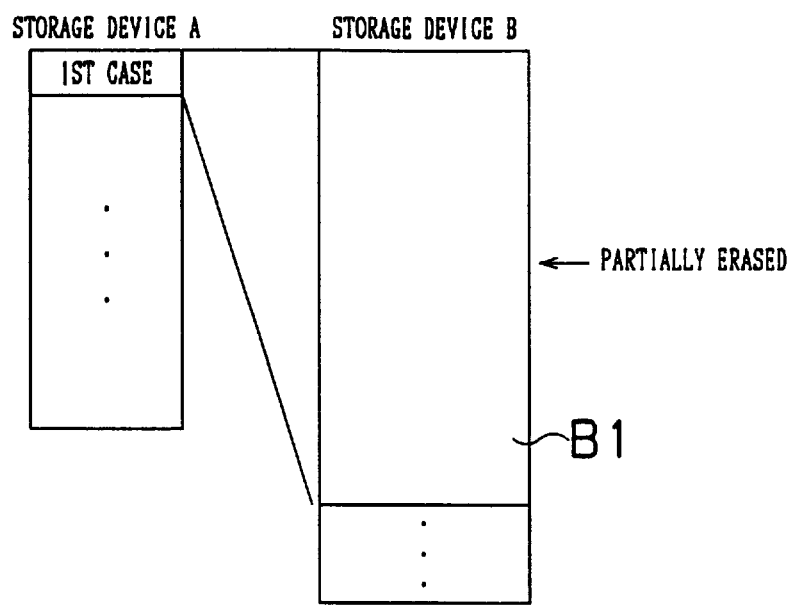
FIG. 22 is a diagram showing the constitution of memory devices A and B included in a telephone set 57 of an eighth embodiment of the invention.

FIG. 22 is a diagram showing the constitution of memory devices A,B contained in a telephone set 57 of an eighth embodiment of the invention. The telephone set 57 is same in constitution as the telephone set 51, and its explanation is omitted. It is a feature of the telephone set 57 of this embodiment is that a specified section is deleted from the storage device B by partial erasure button 18 or the partial erasure command 7#.

Same as in the reproduction example shown in FIG. 19A, when the period T21 is specified as a partial erasure section, the erasure region 41 shown in FIG. 20 is deleted as the section of partial erasure operation as shown in the storage device B in FIG. 22.

Figure 23:
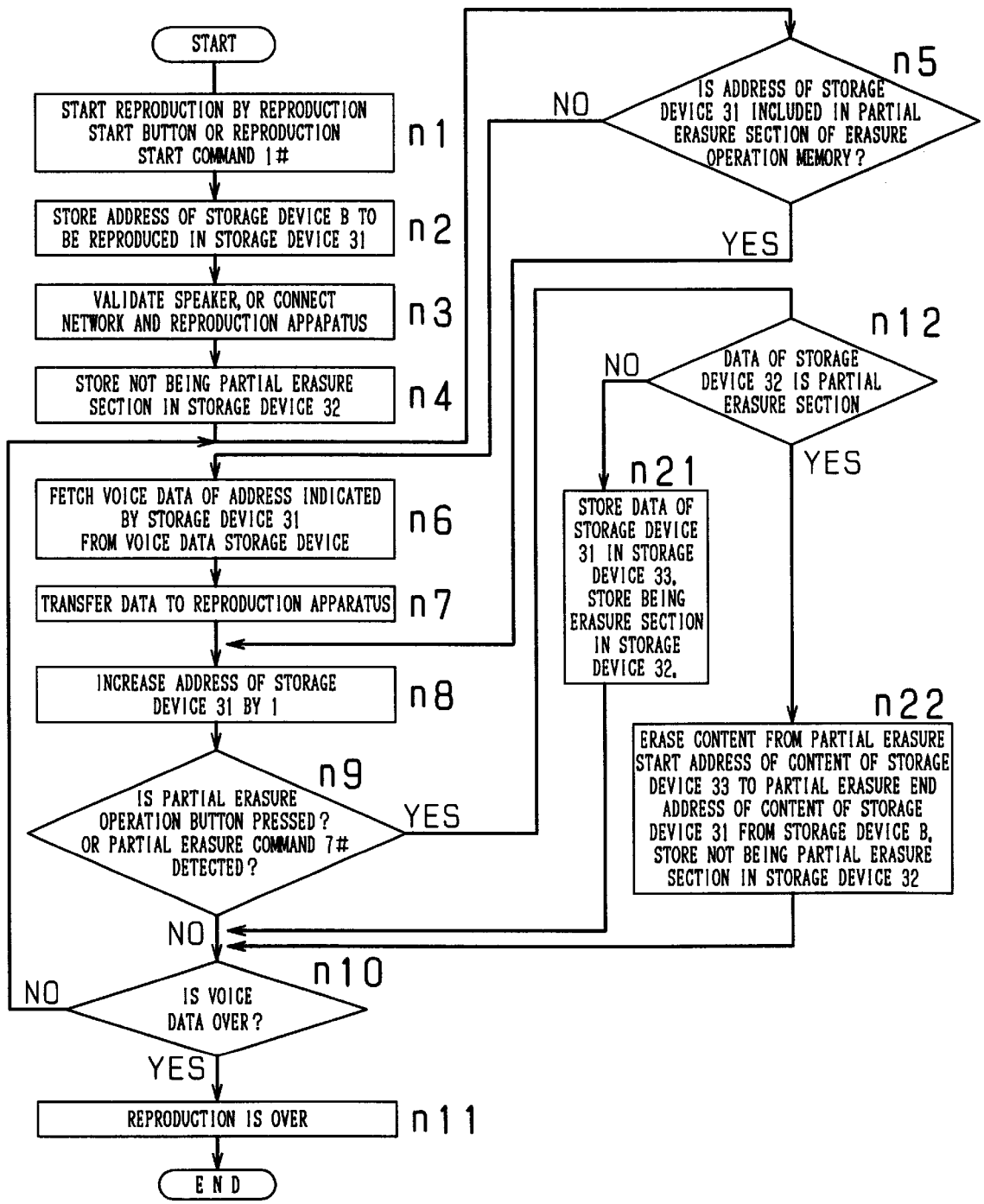
FIG. 23 is a flowchart of processing of partial erasure operation in the telephone set 57.

FIG. 23 is a flowchart of partial erasure operation. In this flow chart, the same processes as in the flowchart shown in FIG. 21 are identified with same step numbers and their explanations are omitted. In this flowchart, step n13 in the flowchart in FIG. 21 is replaced by step n21, and step n14, by step n22.

At step n12, if stored as not being a partial erasure section of the storage device 32, the operation goes to step n21. At step n21, it is assumed that first partial erasure operation, that is, start of partial erasure operation has been instructed, and the address of the storage device B to be reproduced which is stored in the storage device 31 is stored in the storage device 33 as partial erasure start address. In the storage device 32, the data in the process of reproduction are stored as partial erasure section. Thereafter, the process following step n10 is carried out.

At step n12, incidentally, if stored as being a partial erasure section in the storage device 32, the operation advances to step n22. At step n22, it is supposed that second partial erasure operation, that is, end of partial erasure operation has been instructed, and the voice data from the partial erasure start address stored in the storage device 33 till the partial erasure end address stored in the storage device 31 are deleted from the storage device B. In the storage device 32, it is stored not as partial erasure section. Thereafter, the process following step n10 is carried out.

Thus, according to the embodiment, the section partially erased by partial erasure operation is deleted from the storage device B, and therefore the voice data stored in the storage device B are not wasteful and the reproduction time of the message can be shortened.

The voice data specified by partial erasure operation are deleted from the storage device B during reproduction with partial erasure operation, or deleted at the next time of reproduction.

Figure 24:
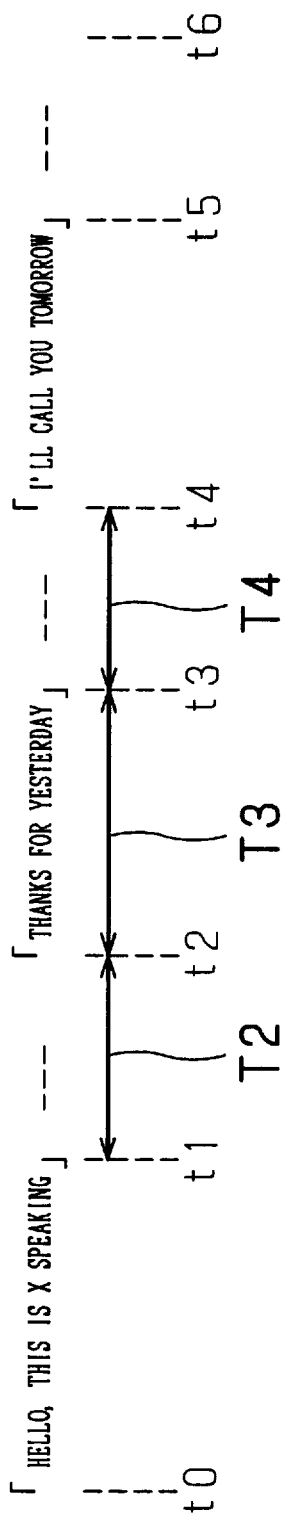
FIGS. 24A, 24B and 24C are timing charts when reproducing a message in a telephone set 58 of a ninth embodiment of the invention.

FIGS. 24A to 24C are timing charts showing an example of reproduction conducted in a telephone set 58 of a ninth embodiment of the invention. The telephone set 58 is same in constitution as the telephone set 51, and its explanation is omitted. It is a feature of the telephone set 58 of this embodiment that an undesired message portion is prevented from being reproduced from the next reproduction on by specifying partial erasure by clause delete button 19 or a clause delete command 8#.

The message reproduced in the timing chart shown in FIG. 24A is same as the reproduction example shown in FIG. 9A, and the explanation is omitted. In the period T3 which is a voiced section in FIG. 24A, when a clause is deleted by pressing the clause delete button 19 or entering the clause delete command 8#, the period T3 and the period T2 and T4 which are silent sections before and after it are not reproduced as shown in FIG. 24B, and "Hello, this is X speaking" and "I'll call you tomorrow" . . . are delivered. In this case, ". . ." means a silent section.

When the clause is deleted in the period T2 which is a silent section, the period T2 is not reproduced as shown in FIG. 24B, and "Hello, this is X speaking," "Thanks for yesterday," . . . "I'll call you tomorrow" . . . are delivered.

Figure 25:
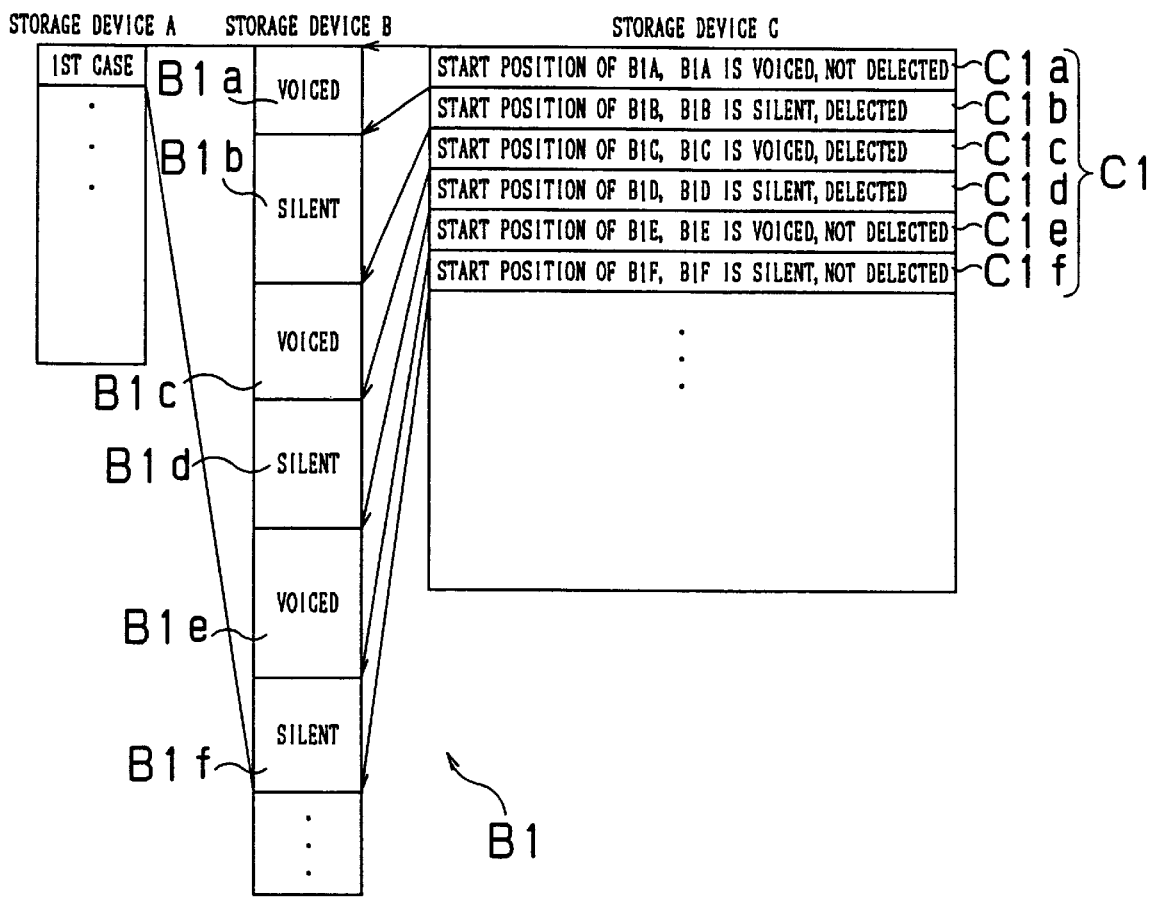
FIG. 25 is a diagram showing the constitution of memory devices A, B and C in the telephone set 58.

FIG. 25 is a diagram showing the data stored in the memory devices A, B and C in the case reproduced as shown in FIG. 24B. In the storage device B, the region B1 where a first message is stored is composed of region portions B1$a$ to B1$f$. The voice data stored in the region portions B1$a$ to B1$f$ correspond to the outputs in the periods T1 to T6 shown in FIG. 24A. Concerning each one of region portions B1$a$ to B1$f$, the data start position, voiced or silent section information, and deleted or not deleted information are stored in the region portions C1$a$ to C1$f$. The deletion information in region portions C1$b$ to C1$d$ storing the data of the region portions B1$b$ to B1$d$ corresponding to periods T2 to T4 in which the clause is deleted is "deleted" and the voice data in region portions B1$b$ to B1$d$ are not reproduced.

Figure 26:
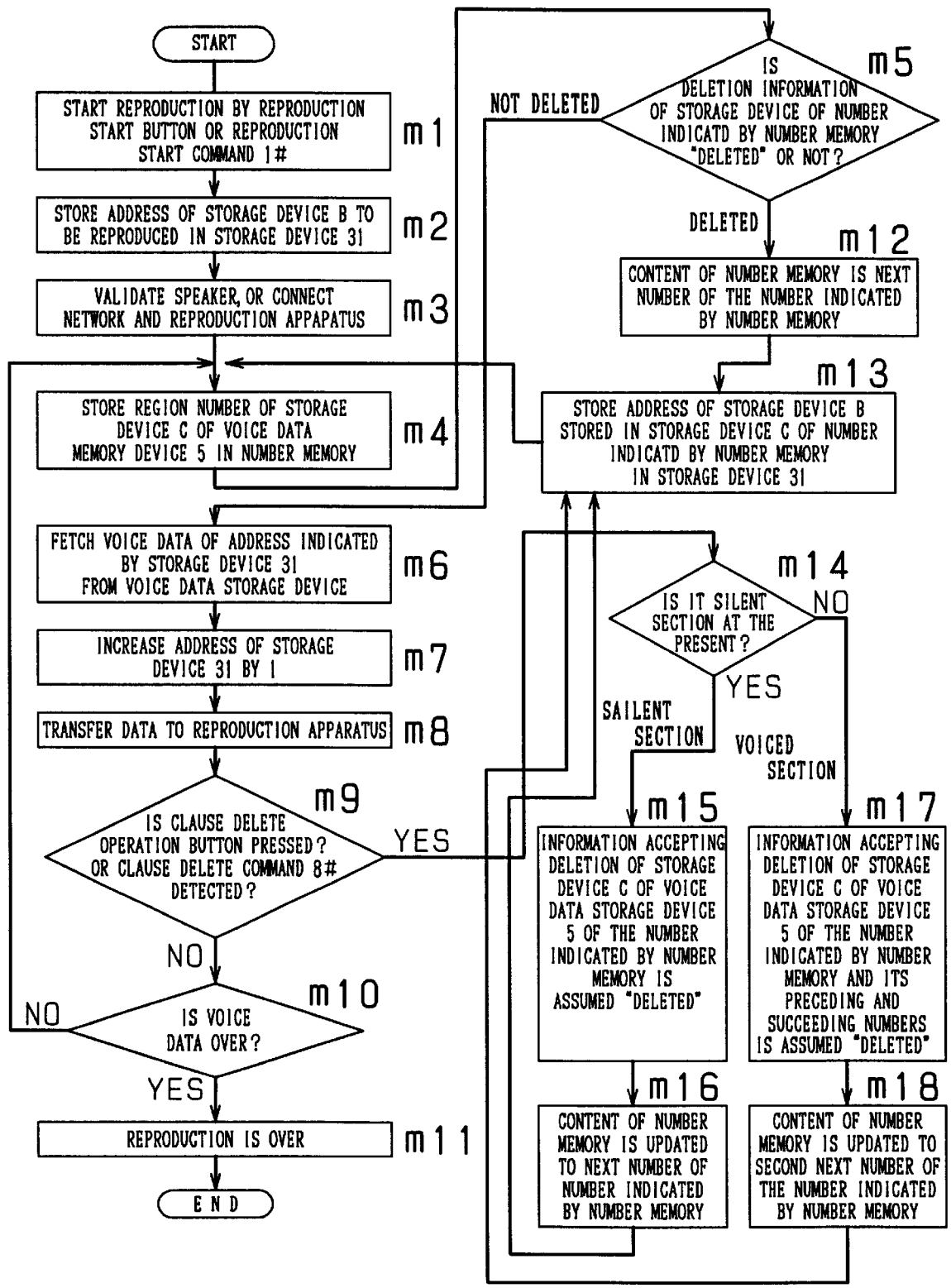
FIG. 26 is a flowchart showing a process of clause deletion processing in the telephone set 58.

FIG. 26 is a flowchart for clause delete process in the telephone 58. At step m1, reproduction is started when the reproduction start button 14 is pressed or the reproduction start command 1# is inputted. At step m2, the address of the storage device B storing the first message is read out from the storage device A, and is stored in the storage device 31. At step m3, in the case the reproduction has been started by pressing the reproduction start button 14, the connection route between the reproduction apparatus 4 and speaker 12 is validated so that the message may be delivered through the speaker 12, and in the case of reproduction start by input of the reproduction start command, the connection route between the reproduction apparatus 4 and network controller 2 is validated so that the voice signal may be delivered to the telephone circuit network 13.

At step m4, the region number of the storage device C is stored in the number memory 38. A succeeding region number is stored in the number memory 38 when reproduction of the voice data corresponding to the region number is over. Therefore, the region number of the storage device C corresponding to the voice data in the process of reproduction is always stored in the number memory 38.

At step m5, it is judged whether the deletion information of the storage device C shown by the region number stored in the number memory 38 is "deleted" or not. When the deletion information in the storage device C is "not deleted," the operation goes to step m6. At step m6, referring to the address stored in the storage device 31, the voice data are read out from the storage device B. At subsequent step m7, to read out the next voice data, the address stored in the storage device 31 is increased by 1. At step m8, the voice data being read out at step m6 are inputted into the reproduction apparatus 4. At subsequent step m9, it is judged whether clause delete operation has been done or not by seeing whether the clause delete operation button 19 is pressed or the clause delete command 8# is inputted. When clause delete operation is not done, the operation goes to step m10. At step m10, it is judged whether the voice data to be reproduced are finished or not. When the voice data to be reproduced are finished, the operation goes to step m11. At step m11, reproduction is terminated, and the process is over.

Meanwhile, at step m5, when the deletion information in the storage device C is "deleted," the operation advances to step m12. At step m12, the region number stored in the number memory 38 is updated to the next number. At subsequent step m13, the voice data start address of the storage device B corresponding to the storage device C of the region number stored in the number memory 38 are stored in the storage device 31. Thereafter, the process after step m4 is executed.

At step m9, when the clause delete operation has been done, the operation goes to step m14. At step m14, it is judged whether the section being reproduced is a voiced section or a silent section. When the section being reproduced is a silent section, the operation goes to step m15.

At step m15, the deletion information of the storage device C corresponding to the region number stored in the number memory 38 is supposed to be "deleted." At subsequent step m16, the region number stored in the number memory 38 is updated to a succeeding number. Thereafter, the process after step m13 is executed.

At step m14, when the section being reproduced is a voiced section, the operation goes to step m17. At step m17, the deletion information of the storage device C indicated by the region number stored in the number memory 38 and region numbers before and after this region number is supposed to be "deleted." At subsequent step m18, the region number stored in the number memory 38 is updated to a succeeding number. Thereafter, the process after step m13 is executed.

Thus, according to the embodiment, by performing clause delete operation when deleting undesired voiced section, the voiced section and silent sections before and after it are not reproduced, or the silent section specified by clause delete operation is not reproduced, and therefore the reproduction time can be shortened without spending labor in operation. Besides, the memory is stored, and, when necessary, the entire message can be reproduced again.

Figure 27:
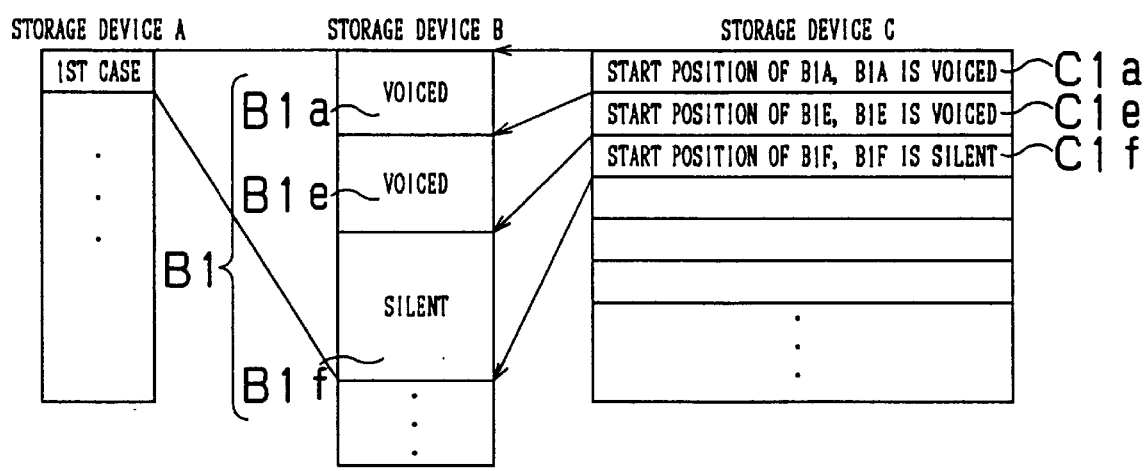
FIG. 27 is a diagram showing the constitution of memory devices A, B and C included in a telephone set 59 of a tenth embodiment of the invention.

FIG. 27 is a diagram showing the constitution of memory devices A, B, C contained in a telephone set 59 of a tenth embodiment of the invention. The telephone set 59 is same in constitution as the telephone set 51, and its explanation is omitted. It is a feature of the telephone set 59 of this embodiment that the data in the region portion storing the voice data for clause deletion by the same operation as in the telephone set 58, and in the region portion storing the information about the same region portion are deleted.

In the storage device B shown in FIG. 27, the region portions B1$b$ to B1$d$ shown in the storage device B in FIG. 25 are deleted, and region portions B1$a$, B1$e$ and B1$f$ are stored in the region B1 as the first voice data. In the storage device C, region portions C1$a$, C1$e$ and C1$f$ corresponding to the region portions B1$a$, B1$e$ and B1$f$ are stored. In the region portions C1$a$, C1$e$ and C1$f$, meanwhile, clause delete information is not stored.

Thus, according to the embodiment, by performing clause delete operation when deleting an undesired voiced section, the voice data corresponding to the voiced section and silent sections before and after the voiced section are deleted from the storage device B, or the voice data corresponding to the silent section specified by clause delete operation are deleted from the storage device B, so that the memory region can be saved without spending labor in operation. When reproducing, moreover, the reproduction time can be shortened.

The voice data specified by clause delete operation are deleted from the storage device B during reproduction with clause delete operation, or deleted at the next time of reproduction.

FIGS. 28A and 28B are timing charts for reproduction of message in a telephone set 60 of an eleventh embodiment of the invention. It is a feature of the telephone set 60 of this embodiment that the region reproduced by raising the reproduction speed is stored when reproduced by raising the reproduction speed by pressing of skip operation button or the like during reproduction of a message, so that the same section is reproduced by raising the reproduction speed in the next reproduction without requiring particular operation.

An example of reproduction shown in FIG. 28A is same as the reproduction example in FIG. 9A, and its explanation is omitted. At time t11 in the timing chart in FIG. 28A, when skip operation is done by pressing of skip operation button 16 or input of the skip operation command, reproduction is done by raising the reproduction speed up to the start position of the next voiced section. By skip operation in the period T11, the address of the region portion B1a in which the voice data being reproduced are stored is stored in the region portion C1a as a skip start position. In the next and subsequent reproductions, as a first method, when reaching the skip start position stored in the region portion C1a, the period T11 is reproduced by raising the reproduction speed without making skip operation. As a second method, reproduction is done by raising the reproduction speed in a period T32 from time t0 to time t2 shown in FIG. 28B.

Figure 29:
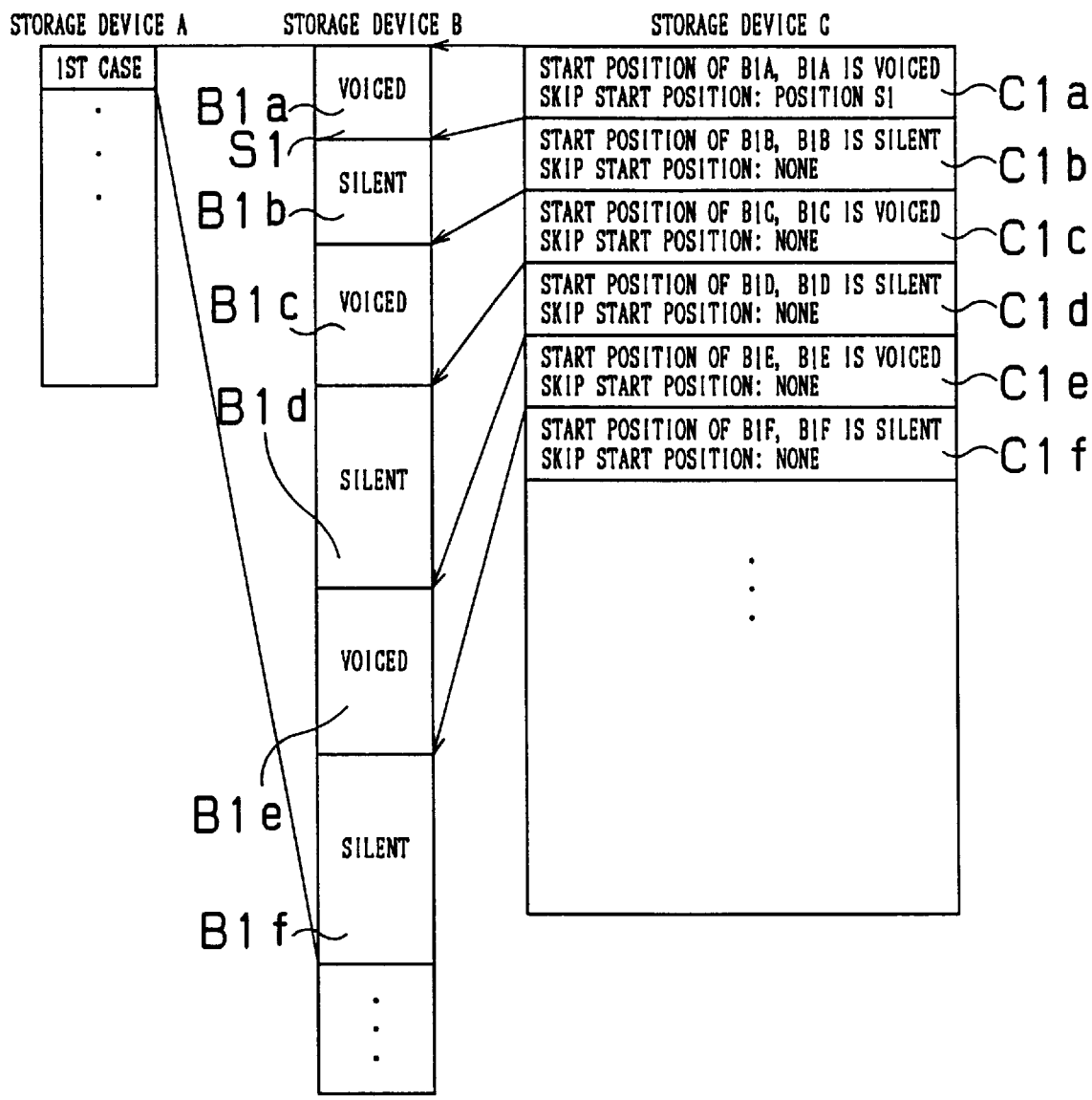
FIG. 29 is a diagram showing the constitution of memory devices A, B and C included in the telephone set 60.

FIG. 29 shows the constitution of memory devices A, B and C contained in the telephone set 60. In the storage device C, the start address of each region portion of the storage device B, voiced and silent section information for the region portion, and a skip start position are stored. As the skip start position, a specified address in the storage device B is stored. When skip operation is effected at time t11 while reproducing the voice data in the region portion B1a, the skip operation position S1 showing the corresponding address is stored as a skip start position in the region portion C1a of the storage device C.

Figure 30:
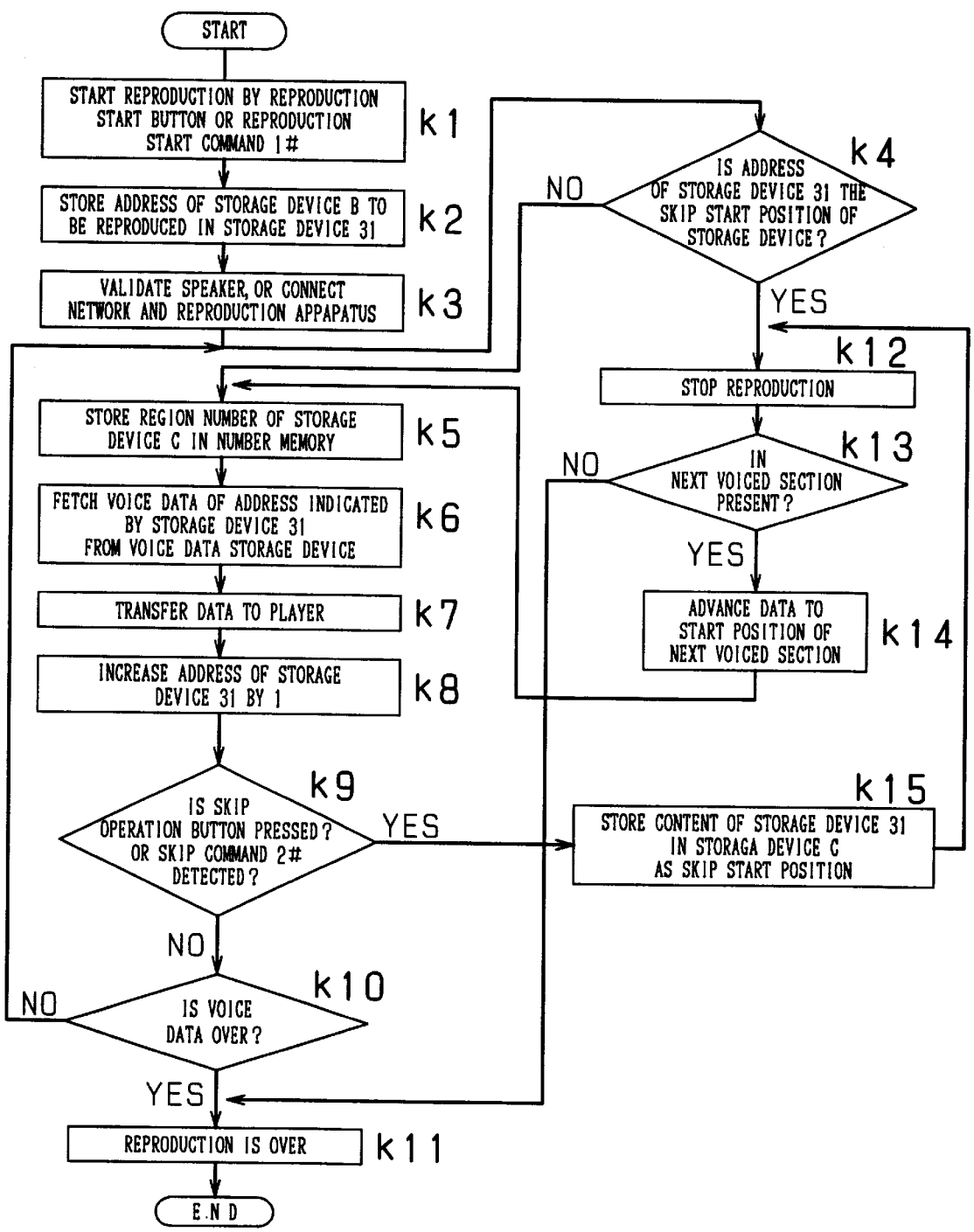
FIG. 30 is a flowchart showing a process of reproduction of a first method in the telephone set 60.

FIG. 30 is a flowchart when reproducing in the first method. At step k1, reproduction is started by pressing the reproduction start button 14 or entering the reproduction start command 1#. At step k2, the address of the storage device B in which a first message is stored is read out from the storage device A, and is stored in the storage device 31. At step k3, in the case of reproduction started by pressing of reproduction start button 14, the connection route between the reproduction apparatus 4 and speaker 12 is validated so that the message may be delivered through the speaker 12, and in the case of reproduction started by input of the reproduction start command, the connection route between the reproduction apparatus 4 and network controller 2 is validated so that the voice signal may be delivered to the telephone circuit network 13. At step k4, it is judged whether the address stored in the storage device 31 is the skip start position stored in the storage device C or not. At step k4, if not a skip start position, the operation advances to step k5. At step k5, the region number in the storage device C is stored in the number memory 38.

At step k6, referring to the address stored in the storage device 31, the voice data are read out from the storage device B. At subsequent step k7, the voice data being readout at step k6 are inputted into the reproduction apparatus 4. At step k8, to read out the next voice data, the address stored in the storage device 31 is increased by 1.

At subsequent step k9, it is judged whether skip operation is done or not, depending on whether the skip operation button 14 is pressed, or the skip operation command 2# is inputted. When skip operation is not done, the operation goes to step k10. At step k10, it is judged whether the voice data to be reproduced are finished or not. When the voice data to be reproduced are finished, the operation goes to step k11. At step k11, reproduction is finished, and the process is over.

At step k4, in the case of skip start operation, the operation advances to step k12. At step k12, reproduction is stopped. At subsequent step k13, it is judged whether the next voiced section is present or not in each section during reproduction. If voiced section is not present, the process after step k11 is effected. If voiced section is present, the operation goes to step k14. At step k14, the reading position of voice data is moved to the start position of a voiced section existing next to the voiced section being reproduced or a silent section.

Figure 31:
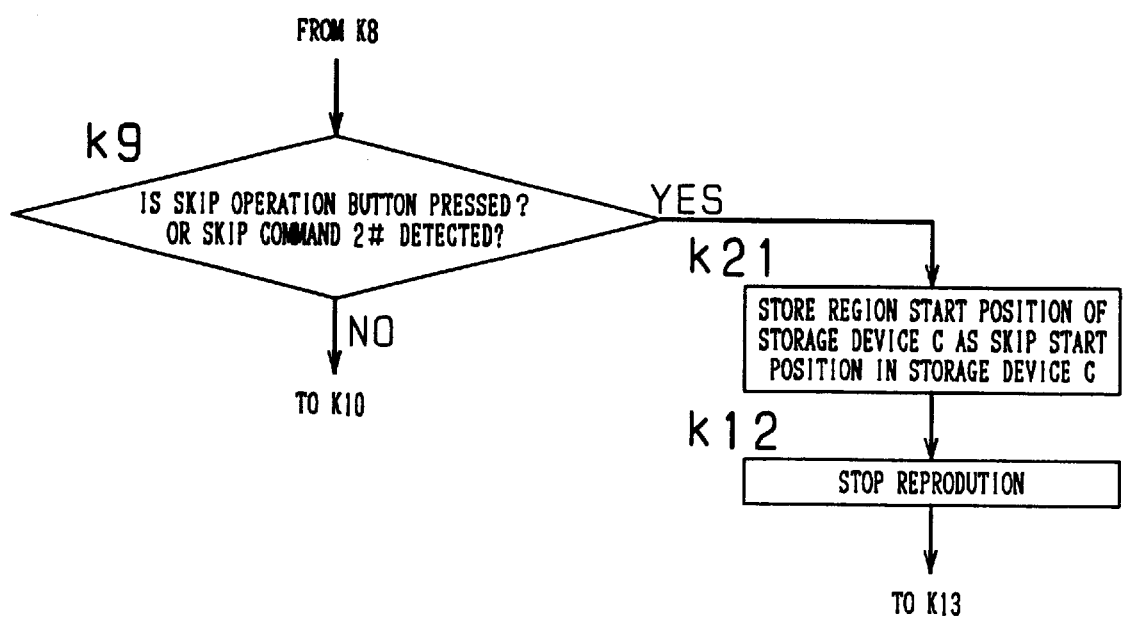
FIG. 31 is a flowchart showing a process of skip reproduction of a second method in the telephone set 60.

At step k9, when skip operation is done, the operation goes to step k15. At step k15, the address of the storage device B stored in the storage device 1 is stored as a skip start position in the storage device C. Thereafter, the process following step k12 is effected. The process for skip operation in the second method is shown in FIG. 28. Other processes not sown in FIG. 31 are same as the processes in the flowchart shown in FIG. 30. At step k9, when the skip operation is done, the operation advances to step k21. At step k21, the region start position stored in the storage device C is stored as a skip start position in the storage device C. After storing, the process following step k12 is carried out. In this embodiment, meanwhile, the method of skipping to the start position of the next voiced section in the case of skip operation is described, but, instead, the reproduction speed may be raised up to the start position of the next voiced section. Moreover, by installing means for erasing the skip start information stored in the storage device C, all message can be heard in the subsequent reproduction.

Thus, according to the embodiment, in the case of skip operation during reproduction of a message, the section not reproduced is stored, and this section is skipped in the next reproduction without requiring particular operation, and it is not needed to repeat the same skip operation, and the controllability is enhanced. As a result, the time required for operation and reproduction can be shortened.

In the foregoing embodiments, processing of reproduction of one message is described, but it is the same when reproducing plural cases.

In the embodiments except for the third embodiment, the user may be notified of the skip process of silent section, by generating a beep sound when skipping a silent section.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A telephone set comprising:
   automatic answering means in said telephone set for starting to answer after reception of a predetermined number of call signals, sending out an answer message, and then converting a voice message including voiced portions and silent portions sent out from the caller side into digital data to store in voice data memory means;
   reproduction means for reading out the digital data from the voice data memory means, and outputting after converting into voice signals;

reproduction operation instructing means for instructing to start reproduction of voice signals and skip-reproduce in voice signal reproduction; and discrimination means for discriminating between the voiced portions and the silent portions of the voice message stored in the voice data memory means, wherein the voice signals are reproduced in response to a reproduction start instruction, and when skip reproduction is instructed in course of a reproduction, skip reproduction is started on the basis of discrimination results of the discrimination means.

2. The telephone set of claim 1, wherein after starting reproduction in response to instruction of skip reproduction, only voiced portions are reproduced.

3. The telephone set of claim 1, the telephone set further comprising reproduction status data memory means for storing portions skip-reproduced; and the portions once skip-reproducted are skipped in the subsequent reproduction by referring to the reproduction status data memory means.

4. The telephone set of claim 1, wherein the reproduction operation instructing means comprises analysis means for discriminating the type of reproduction operation on the basis of a DTMF signal received from a telephone circuit and when start of reproduction is instructed by the analysis means, only voiced portions are reproduced.

5. The telephone set of claim 1, further including means for selectively eliminating certain silent portions in reproduction.

6. The telephone set of claim 1, wherein the voice data memory means includes separate portions for storing voice and silent portions respectively.

7. A telephone set comprising:

automatic answering means in said telephone set for starting to answer after reception of a predetermined number of call signals, sending out an answering message, and then converting a voice message sent out from the caller side into digital data to store in voice data memory means;

first reproduction means for reading out the digital data from the voice data memory means, and outputting after converting into voice signals;

second reproduction means for reading out the digital data from the voice data memory means at faster speed than that of the first reproduction means, and outputting after converting into voice signal;

reproduction operation instructing means for instructing to start reproduction of voice signals and skip-reproduce in voice signal reproduction; and discrimination means for discriminating between voiced portions and silent portions of the voice message stored in the voice data memory means, wherein the voice signals are reproduced in response to reproduction start instruction by the first reproduction means, and when skip reproduction is instructed in course of a reproduction, the voice signals are reproduced by the second reproduction means on the basis of discrimination results of the discrimination means.

8. The telephone set of claim 7, wherein after skip reproduction has been instructed, silent portions are reproduced by the second reproduction means.

9. The telephone set of claim 7, wherein when skip reproduction is instructed in course of reproduction of a voiced portion of the voice message, the voiced portion is reproduced by the first reproduction means, and the subsequent silent portion is reproduced by the second reproduction means.

10. The telephone set of claim 7, the telephone set further comprising reproduction status data memory means for storing a skip-reproduced portion; and the portions of the voice message once skip-reproduced are reproduced in the next reproduction by the second reproduction means.

11. The telephone set of claim 10, wherein the reproduction status data memory means stores the point of time when skip reproduction was instructed by the reproduction operation instructing means, and the next reproduction is started from this point of time by the second reproduction means.

12. The telephone set of claim 10, wherein when skip reproduction is instructed by the reproduction operation instructing means in the course of reproduction of a voiced portion of the voice message, the reproduction status data memory means stores the start position of the voiced portion, and in the next reproduction, reproduction from the start position on is carried out by the second reproduction means.

13. The telephone set of claim 10 or 3, the telephone set further comprising means for erasing reproduction status data stored in the reproduction status data memory means.

14. The telephone set of claim 7, wherein the reproduction operation instructing means instructs reverse reproduction in which reproduction sequence of voice signals is reversed, when reverse reproduction is instructed in course of reproduction, voice signals are reversely reproduced from the position on where the reverse reproduction was instructed by the second reproduction means, and on judging the start position of the closest voiced portion, reproduction is started by the first reproduction means.

15. The telephone set of claim 7, wherein the reproduction operation instructing means comprises analysis means for discriminating the type of reproduction operation on the basis of a DTMF signal received from a telephone circuit, and when start of reproduction is instructed by the analysis means, voiced portions are reproduced by the first reproduction means and silent portions are reproduced by the second reproduction means.

16. The telephone set according to claim 7 wherein the voiced portions are portions above a preset sound level and the silent portions are portions below a preset sound level.

17. A telephone set comprising:

automatic answering means in said telephone set for starting to answer after reception of a predetermined number of call signals, sending out an answering message, and then converting a voice message sent out from the caller side into digital data to store in voice data memory means:

reproduction means for reading out the digital data from the voice data memory means, and outputting after converting into voice signals;

discrimination means for discriminating between voiced portions and silent portions of the voice message stored in the voice data memory means;

reproduction operation instructing means for instructing to start reproduction of voice signals and partially erase voice signals; and reproduction status data memory means for storing the reproduction status data showing the reproduction status of a voice signal in correspondence to the digital data of the voice data memory means, wherein when partial erasure is instructed in course of reproduction of a voiced portion partial erasure data indicating that the voiced portion and the silent portions before and after the voiced portion are the portion to be erased are stored in the reproduction status data memory means, and when partial erasure is instructed in course of reproduction of a silent portion, the partial erasure data indicating that the silent portion is the part to be erased are stored in the reproduction status data memory means, and when partial erasure data are detected in course of reproduction, the corresponding voiced portion and silent portion are not reproduced.

18. The telephone set according to claim 17 wherein the voiced portions are portions above a preset sound level and the silent portions are portions below a preset sound level.

19. A telephone set comprising:

automatic answering means in said telephone set for starting to answer after reception of a predetermined number of call signals, sending out an answering message, and then converting a voice message sent out from the caller side into digital data to store in voice data memory means;

reproduction means for reading out the digital data from the voice data memory means, and outputting after converting into voice signals;

discrimination means for discriminating between voiced portions and silent portions of the voice message store in the voice data memory means;

reproduction operation instructing means for instructing to start reproduction of voice signals and partially erase voice signals; and reproduction status data memory means for storing the reproduction status data showing the reproduction status of a voice signal in correspondence to the digital data of the voice data memory means, wherein when partial erasure is instructed in course of reproduction of a voiced portion, partial erasure data indicating that the voiced portion and the silent portions before and after the voiced portions are the portion to be erased are stored in the reproduction status data memory means, and when partial erasure is instructed in course of reproduction of a silent portion, the partial erasure data indicating that the silent portion is the part to be erased are stored in the reproduction status data memory means, and when partial erasure data are detected in course of reproduction, the digital data of the corresponding voiced portion and silent portion are erased.

20. The telephone set of claim 19, the telephone set further comprising means for erasing partial erasure data stored in the reproduction status data memory means.

21. The telephone set according to claim 19 wherein the voiced portions are portions above a preset sound level and the silent portions are portions below a preset sound level.

22. A telephone set comprising:

automatic answering means in said telephone set for starting to answer after reception of a predetermined number of call signals, sending out an answering message, and then converting a voice message sent out from the caller side into digital data to store in voice data memory means;

reproduction means for reading out the digital data from the voice data memory means, and outputting after converting into voice signals;

discrimination means for discriminating between voiced portions and silent portions of the voice message stored in the voice data memory means; and reproduction operation instructing means for instructing to start voice signal reproduction and partially erase voice signals, wherein when partial erasure is instructed in course of reproduction of a voiced portion, the digital data corresponding to the voiced portion and the silent portions before and after the voiced portion are erased from the voice data memory means, and when partial erasure is instructed in course of reproduction of a silent portion, the digital data corresponding to the silent portion are erased from the voice data memory means.

23. The telephone set according to claim 22 wherein the voiced portions are portions above a preset sound level and the silent portions are portions below a preset sound level.

24. A telephone set comprising:

automatic answering means in said telephone set for automatically starting to answer after reception of a predetermined number of call signals, sending out an answer message, and then converting a received voice message including voiced portions above a preset sound level and portions, below a preset sound level sent out from the caller side into digital data to store directly into a voice data memory means;

reproduction means for reading out the digital data from the voice data memory means, and outputting after converting into voice signals;

reproduction operation instructing means for instructing to start reproduction of voice signals and skip-reproduce in voice signal reproduction; and discrimination means for discriminating between the portions above a preset sound level and portions below a preset sound level of the voice message stored in the voice data memory means, wherein the voice signals are reproduced in response to reproduction start instruction, and when skip reproduction is instructed in course of reproduction, skip reproduction is started on the basis of discrimination results of the discrimination means.

* * * * *